United States Patent [19]

Nakao

[11] Patent Number: 6,061,697

[45] Date of Patent: May 9, 2000

[54] SGML TYPE DOCUMENT MANAGING APPARATUS AND MANAGING METHOD

[75] Inventor: Yoshio Nakao, Kawasaki, Japan

[73] Assignee: Fujitsu Limited, Kawasaki, Japan

[21] Appl. No.: 08/917,278

[22] Filed: Aug. 25, 1997

[30] Foreign Application Priority Data

Sep. 11, 1996 [JP] Japan .................................. 8-240250

[51] Int. Cl.[7] .................................................. G06F 17/30
[52] U.S. Cl. .............................. 707/513; 707/3; 707/103; 707/203; 707/517
[58] Field of Search ................................. 707/3, 103, 203, 707/500, 501, 517, 513

[56] References Cited

U.S. PATENT DOCUMENTS

| | | | |
|---|---|---|---|
| 5,008,853 | 4/1991 | Bly et al. .................................. | 345/331 |
| 5,496,071 | 3/1996 | Walsh ........................................ | 283/70 |
| 5,655,130 | 8/1997 | Dodge et al. ............................. | 707/511 |
| 5,669,005 | 9/1997 | Curbow et al. ........................... | 707/523 |
| 5,677,835 | 10/1997 | Carbonell et al. ........................ | 704/8 |
| 5,737,739 | 4/1998 | Shirley et al. ........................... | 707/512 |
| 5,848,386 | 12/1998 | Motoyama ............................... | 707/513 |
| 5,873,097 | 2/1999 | Harris et al. ............................. | 707/203 |
| 5,907,837 | 5/1999 | Ferrel et al. .............................. | 707/3 |
| 5,918,010 | 6/1999 | Appleman et al. ................. | 395/200.33 |

FOREIGN PATENT DOCUMENTS 0 650 126 A1   4/1995   European Pat. Off. .

0 762 297 A2   3/1997   European Pat. Off. ................... 17/24

OTHER PUBLICATIONS

Lemay, Laura, "teach yourself Web Publishing with HTML 3.2 in a week", 3rd Edition, 1996 by Sam.net Publishing, ISBN: 1-57521-192-0, pp 439-440, 1996.

Primary Examiner—Jack M. Choules
Assistant Examiner—Shahid Alam
Attorney, Agent, or Firm—Staas & Halsey LLP

[57] ABSTRACT

An SGML document accessing unit to automatically create a partial editing document type definition DTD, according to a partial editing request for an SGML type document, that represents a restriction against partial editing to keep the document conformance to the DTD of an entire document. An SGML document editing apparatus edits a portion of the document to be edited corresponding to the restriction of the partial editing DTD that represents a restriction against partial editing due to the existing document structure and influence of other editing works executing in parallel at the time when a partial editing request is issued. An extended content model is attached to every document element of a stored SGML document to reduce the cost of creating a partial editing DTD. The extended content model is a variant of a content model of an element declaration in a DTD, and it represents arrangement of child document elements of its relating document element with instance identifiers of the child document elements. Revision histories of the extended content models of all document elements are also recorded to make history information of the document structure.

40 Claims, 30 Drawing Sheets

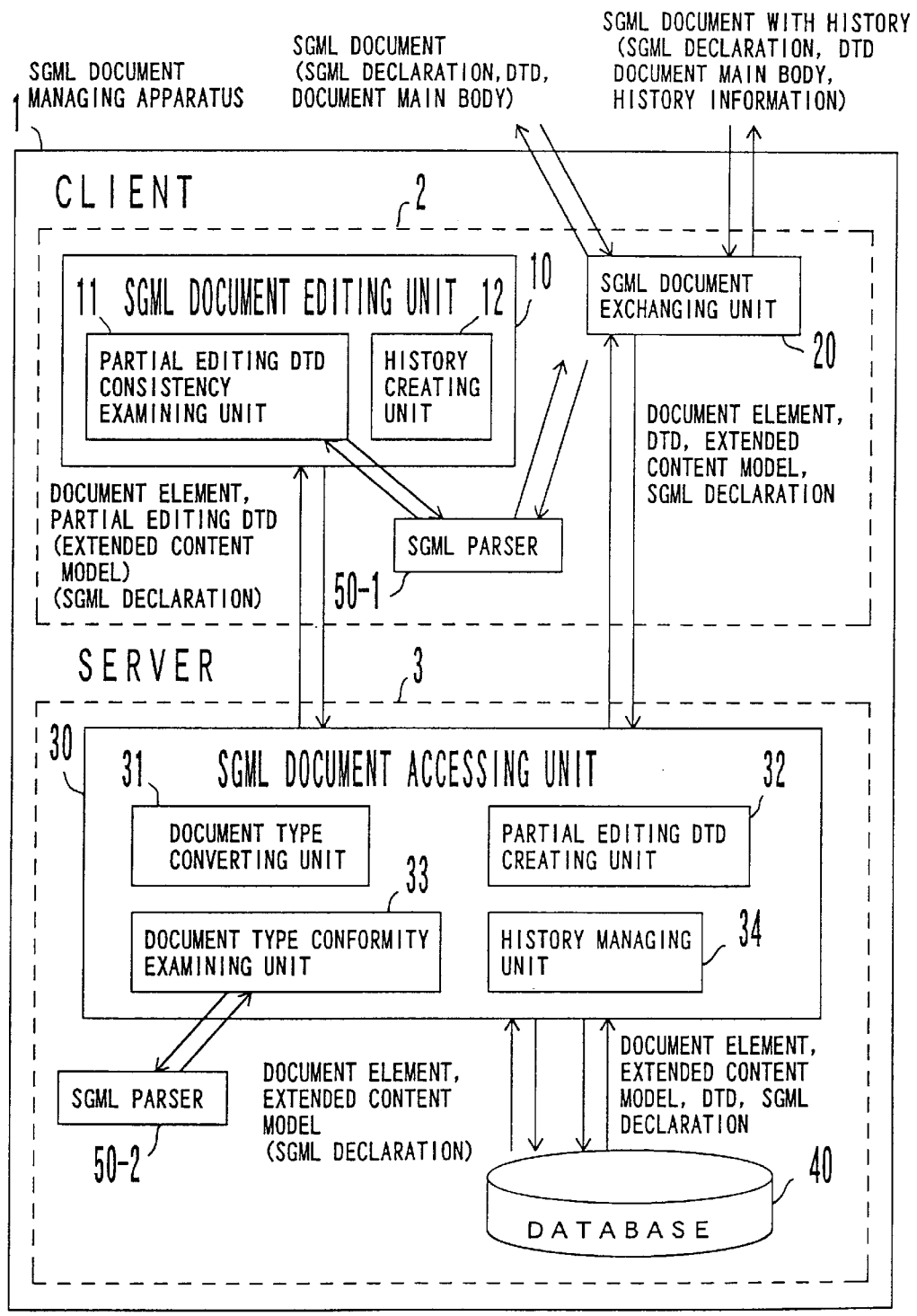
F I G. 1

INFORMATION OF ENTIRE DOCUMENT

SYSTEM MANAGIMENT INFORMATION
- DOCUMENT IDENTIFIER
- SYSTEM NAME
- SYSTEM ADMINISTRATOR
- ROOT ELEMENT INSTANCE IDENTIFIER
- RELATION INFORMATION BETWEEN DTD AND SGML DECLARATION
- RELATED REVISION INFORMATION
    SHARED DOCUMENT ELEMENT IDENTIFIER
    :
- SYSTEM RESOURCE
    :
PROFILE INFORMATION
DOCUMENT HISTORY INFORMATION
   REVISION INFORMATION(1)
      REVISION NUMBER
      REVISION DATE AND TIME
      REVISOR
      REVISION UNIT
      REVISION NAME
      COMMENT
      ELEMENT DIFFERENCE INFORMATION (1)
      ELEMENT IDENTIFIER
      OLD ELEMENT REVISION NUMBER
      (DIFFERENCE INFORMATION)
         OLD ELEMENT INSTANCE IDENTIFIER
         COMMENT
         DIFFERENCE
      ELEMENT DIFFERENCE INFORMATION (2)
   :
REVISION INFORMATION (2)
:

FIG. 4A

INFORMATION OF EACH DOCUMENT ELEMENT

INSTANCE IDENTIFIER
  DOCUMENT IDENTIFIER
  ELEMENT IDENTIFIER
PARENT INSTANCE IDENTIFIER
SHARED INFORMATION
    - SHARED INSTANCE IDENTIFIER
    - RELATION TABLE OF ELEMENT IDENTIFIERS IN LOWER HIERARCHICAL LEVEL
    - SHARE MODE
ATTRIBUTE INFORMATION
TAG
INFORMATION ON IMMAEDIATE LOWER HIERARCHICAL LEVEL
   EXTENDED CONTENT MODEL OR CHARACTER DATA
HISTORY INFORMATION BY ELEMENT
   REVISION NUMBER
   OLD ELEMENT INFORMATION
    - COMMENT
    - OLD ELEMENT INSTANCE IDENTIFIER
    - OLD ELEMENT REVISION NUMBER
    - CHILD ELEMENT DELETE/MOVE INFORMATION
   (DIFFERENCE INFORMATION)
SYSTEM MANAGEMENT INFORMATION

FIG. 4B

```
<!SGML...]>
<!DOCTYPE MEMO...]>
<MEMO>
<SECT>
<P> FIRST PARAGRPH </P>
<P> SECOND PARAGRPH</P>
</SECT>
<SECT>
<P> THIRD PARAGRPH</P>
<SECT>
</MEMO>
```

FIG. 5

```
<extended content model>::=<extended model group> |
                  <extended model group> <inclusions> |
                  <extended model group> <exclusions> |
                  <extended model group> <exclusions> <inclusions> |
                  <declared content>

<model group>       ::= '('<model list>')' |
                       '('<model list>')' <occurrence indicator> |
                       'ANY'

<extended model group>  ::= '('<extended model list>')' |
                           '('<extended model list>')'<occurrence indicator> |
                           <repeatable model group> |
                           'ANY'

<repeatable model group>  ::=
           '(' '+' <removable instance number><generic identifier>
           <occurrence indicator>',' <extended model list>')' |
           '(' '+' <removable instance number> '('<model list>')'
           <occurrence indicator>',' <extended model list>')'

<model list>  ::=<content token> | <model list><connector><content token>

<extended model list>  ::=<extended content token> |
                <extended model list><connector><extended content token>

<content token> ::=<model group> | <primitive content token>

<extended content token> ::=<extended model group> |
                            <primitive extended content token>

<inclusions>    ::= '+' '('<generic identifier list>')'

<exclusions>    ::= '-' '('<generic identifier list>')'

<generic identifier list> ::= <generic identifier> |
         <generic identifier list><connector><generic identifier>

<primitive content token> ::=<generic identifier> |
         <generic identifier><occurrence indicator> | '#' 'PCDATA'

<primitive extended content token> ::=<generic identifier> |
         <generic identifier><occurrence indicator> |
         <generic identifier><instance identifier> |
         <generic identifier><occurrence indicator><instance identifier> |
         '#' 'PCDATA'

<occurrence indicator>  ::= '*' | '?' | '+'

<connector>     ::= ',' | '&' | '|'

<declared content>   ::= 'CDATA' | 'RCDTA' | 'EMPTY'
```

FIG. 7

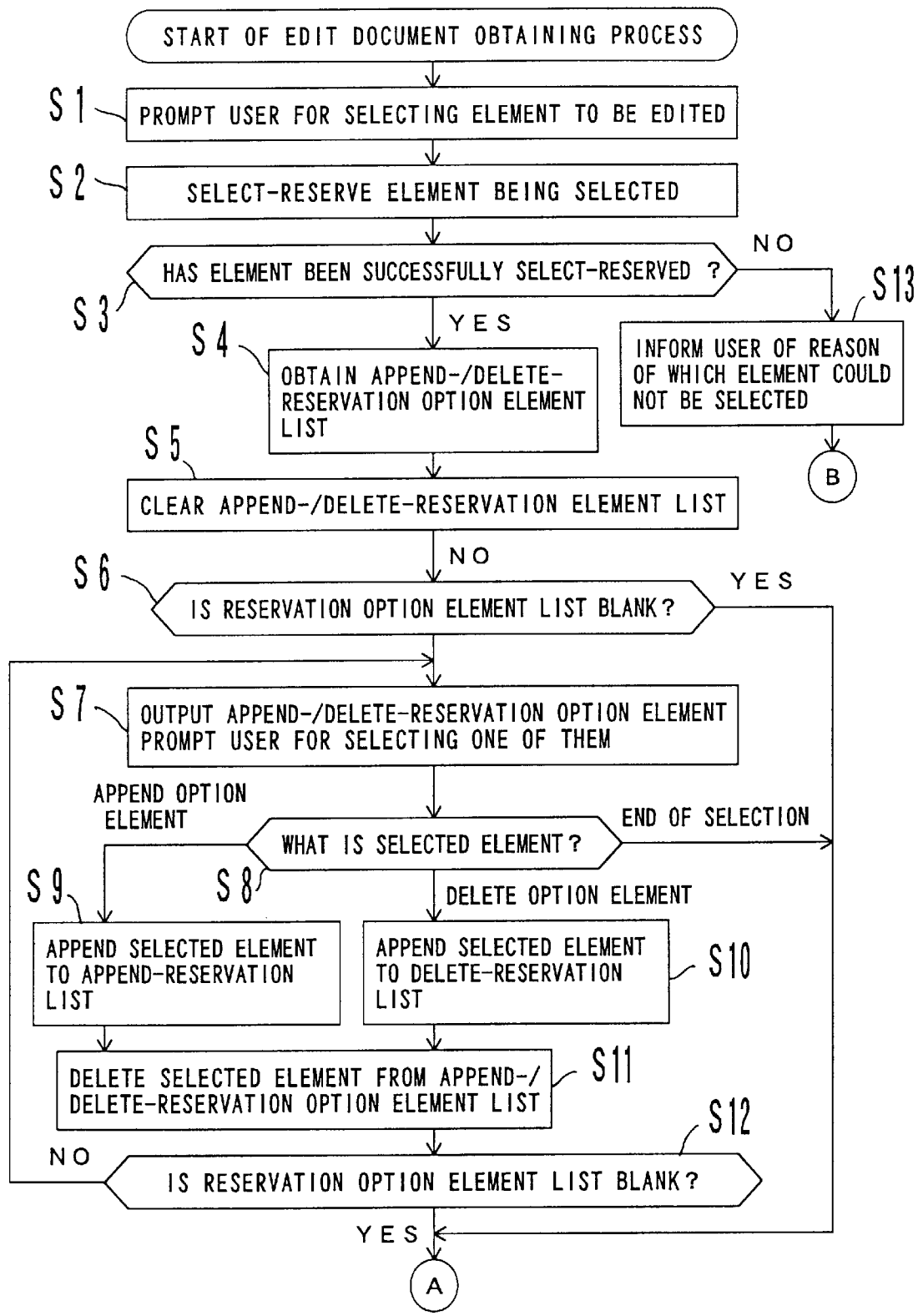
F I G. 1 3

```
<!DOCTYPE ESD [

<!ELEMENT ESD (ESDheader,ESDdoc)>
<!ATTLIST ESD docid ID #REQUIRED>
<!ELEMENT ESDheader (revisionDesc)>
<!--HISTORY INFORMATION -->
<!ELEMENT revisionDesc (change+)>

<!--REVISION INFORMATION OF ONE ELEMENT -->
<!ELEMENT change (date, resp, label, comment, changedpart)>
<!ATTLIST change
    ver ID #REQUIRED-REVISION IDENTIFIER -
    targets IDREFS #REQUIRED-REVISION UNIT -
>
<!--REVISED DATE AND TIME--> <!ELEMENT date (#PCDATA)>
<!--REVISOR --> <!ELEMENT resp (#PCDATA)>
<!--REVISION NAME --> <!ELEMENT label (#PCDATA)>
<!--COMMENT --> <!ELEMENT comment (#PCDATA)>

<!--ELEMENT DIFFERENCE DATA -->
<!ELEMENT changedpart (elm | dtd | ent)+>

<!--DIFFERENCE DATA OF ONE ELEMENT-->
<!ELEMENT elm (delid?, att*, parent?, children?, data?)>
<!ATTLIST elm
    id IDREF #REQUIRED-ELEMENT IDENTIFIER OF REVISED ELEMENT -
    ver IDREF #REQUIRED -ORIGINAL REVISION IDENTIFIER
                        OF ELEMENT THAT HAS BEEN REVISED -
    status  (mod | new | del) #REQUIRED-DISTINCTION OF UPDATE,
                                          APPEND, DELETE -
>

<!--STORING ID OF ELEMENT BEING DELETED -->
<!ELEMENT delid EMPTY>
<!ATTLIST delid id ID #REQUIRED>

<!--VALUE OF ATTRIBUTE BEFORE REVISION-->
<!ELEMENT att EMPTY>
<!ATTLIST att name NAME #REQUIRED value CDATA #REQUIRED>
```

FIG. 20

```
<!VALUE BEFORE REVISION OF PARENT INSTANCE IDENTIFIER
<!ELEMENT parent EMPTY>
<!ATTLIST parent
   id IDREF #REQUIRED
   ver IDREF #REQUIRED>

<!-LIST OF CHILD ELEMENTS OF FORMER REVISIONS->
<!ELEMENT children (importelms?, exportelms?)>
<!ATTLIST children
   ids IDREFS #REQUIRED
   vers IDREFS #REQUIRED>

<!-IMPORTED/EXPORTED CHILD ELEMENTS->
<!ELEMENT (importelms | exportelms) EMPTY>
<!ATTLIST impotelms
   ids IDREFS #REQUIRED
   vers IDREFS #REQUIRED
   origs NAMES #REQUIRED  -PARENT INSTANCE IDENTIFIER OF SOURCE-
>
<!ATTLIST exportelms
   ids IDREFS #REQUIRED
   vers IDREFS #REQUIRED
   targs NAMES #REQUIRED  -PARENT INSTANCE IDENTIFIER OF DESTINATION -
>

<!-VALUE OF CHARACTER DATA OF FORMER REVISIONS ->
<!ELEMENT data CDATA>

:   (REVISION HISTORY OF DTD(dtd) AND ENTITY (ent))

<!ESDdoc-DEFINITION OF SGML DOCUMENT MAIN BODY>

:   (ELEMENT IDENTIFIER, REFERENCE OF REVISION IDENTIFIER, AND
       COPY/LINK ATTRIBUTES (COPY SOURCE, CHANGE MODE, AND COPY
       DESTINATION) ARE ASSIGNED TO EACH ELEMENT)

->
]>
```

F I G. 2 1

SGML TYPE DOCUMENT MANAGING APPARATUS AND MANAGING METHOD

BACKGROUND OF THE INVENTION

1. Field of the Invention

The present invention relates to an SGML (Standard Generalized Markup Language) document managing apparatus for allowing users to collaboratively create, edit, and revise a large SGML document sequence, such as a manual.

2. Description of the Related Art

In recent years, many machine-readable documents are available; a new document can be easily created by recomposing existing machine-readable documents. Reuse of components of existing electronic documents remarkably reduces the cost of creating a document. In addition, as there is an increase in the volume and types of manuals due to the advancement of technologies and the advent of new document circulating media such as the Internet, the number of documents to be managed has explosively increased. Inevitably, needs for re-using electronic documents are becoming strong. SGML has been proposed for satisfying such needs and is used worldwide.

The SGML format is designed to provide a machine-independent way of document encoding, and to enable document interchange from one hardware and software environment to another without loss of information. In addition, the format of an SGML document can be easily recognized by computer. A part of the contents of one SGML document can be easily re-used as a part of another. Moreover, the same SGML document can be re-used in various forms.

Thus, SGML documents have been mainly used for creating and managing technical documents, such as manuals, computer aided printing, and electronic publishing. In addition, SGML documents have been widely used for fields that handle large and long-life documents such as network communications, electronic trading, and databases such as electronic libraries. For example, books and catalogs of electronic libraries have been stored and managed in the SGML format. Moreover, the HTML format used for text interchange in the Internet, a communications system that is explosively growing day by day, is a kind of the SGML format.

Since documents in the SGML format have been widely and massively used, the necessity of an apparatus that manages SGML documents is becoming strong. The main features of SGML documents are that they are of large-scale and long-life. Thus, the SGML document managing apparatus should support the life-cycle of SGML documents, such as creation, storage, and re-use thereof. The structures of SGML documents should conform to document type definitions (DTD). Thus, the apparatus also requires a document structure consistency managing system.

The present invention relates to such an SGML document managing apparatus that has a document structure consistency managing system and a document structure revision history managing system.

The following prior art technologies have been used.

(1) Technology for maintaining the consistency of an entire document that is collaboratively edited To create a document of a large volume, the environment that enable collaborative works and re-use of existing documents for creating and editing a document are required. The SGML document managing apparatus should have a system that allows parts of a document to be independently edited while maintaining the consistency of the entire document.

Even if individual works are properly performed, they may conflict with each other and break the entire document consistency. If one work conflicts with another work that is performed along with it, its result should be saved to the original document after the conflicted parts are corrected or are discarded. (If inconsistent work results are saved, the resultant SGML document cannot be used for other SGML applications.) Thus, the work efficiency deteriorates.

To solve this problem, the conventional structured document managing apparatus uses a check-out/check-in system. In other words, every document portion to be edited is checked out so that the portion of the document is assigned a read-only state whereby the other workers cannot update this portion. After the editing work is completed, the document is checked in so that the read-only state is canceled. In the process of editing, the particular worker can update only portions that have been checked out.

The fundamental structure of a conventional SGML document managing apparatus is the same as that of the above-described structured document managing apparatus. The conventional SGML document managing apparatus uses the check-out/check-in system of document elements. It checks out a document element according to the request for editing from a worker, and allows the worker to update only the portion in lower hierarchical levels than the checked-out element. When the portion is checked in, it examines the conformance to the DTD of the entire document to maintain the consistency of the document (this operation is referred to as SGML parsing).

(2) Technology for effectively parsing an SGML document

To examine whether or not an SGML document that has been partially updated conforms to the DTD (namely, to parse the SGML document), all elements of the document including elements that are not edited should be examined. In other words, each document element should be correlated with the DTD starting with the root document element; thus as well as the result of editing the tag information (generic identifiers) of unedited parts are necessary to examine the result of partial editing. (The generic identifier (GI) is a name that represents the type of a document element. The DTD defines the arrangement of document elements that can occur in the immediately lower hierarchical level of a particular type of document element in terms of a sequence of generic identifiers.)

To simply perform this operation, the document managing apparatus that stores an SGML document in units of document elements extracts tags of document elements, at least all the tags in the document part preceding the edited portion, from a database that stores the document. However, the cost to access the database that stores the document is high. To solve this problem, in the conventional technologies, a document structure and document contents are separately stored, or every document element is stored with a tag sequence of its preceding part so that necessary tag information to parse can be quickly extracted. Thus, the cost for parsing an SGML document is reduced.

(3) Technologies for managing the revision history of an SGML document

With respect to management of a revision history of an SGML document, technologies for managing structured documents such as SGML documents have not matured. Technologies for holding changes of a structure as a revision history have not been established. Generally, in a method for managing a revision history for each document element, only the original document element of the revised document or the difference due to the revision is stored. Thus, a history of structural changes, such as changes of positions of document elements, is not held. As a related art reference for managing a history of structural changes, a "structural database system" has been disclosed as Japanese Patent Laid-Open Publication No. 6-250895. However, in this system, documents are represented in a machine-dependent format. Thus, SGML documents with history information cannot be freely interchanged.

There are two problems to be solved by the present invention.

1) Restrictions for updating a document too strong.

When a document is collaboratively edited, while keeping individual editing works correct, the consistency of the entire document should be also maintained. However, in the conventional technologies, the consistency of the entire document takes too much precedence over the independence of the individual editing works.

In the conventional technologies, only the checked-out portion of a document (namely, the contents and attributes of document elements in lower hierarchical levels than a particular document element (sequence) to be checked out) can be edited. Thus, the tag(s) of the checked-out element(s), which represents a type of document element, is prohibited from being changed. In addition, the document element(s) that has been checked out is prohibited from being divided and deleted. Only the portions that have a dependent relation in the DTD are substantially unable to be edited at the same time. Depending on the DTD, a tag may be changed independently from another work, or an element may be divided or deleted independently from another work. Without analysis of document element dependency in the DTD, these restrictions should become unnecessarily strong.

For example, when a document is collaboratively created section by section, a writer may want to divide his/her checked-out section. The restriction against doing so without analysis of the DTD prohibits this operation. The writer should stop editing, check out the document element in the one-level higher hierarchical level, and re-edit. When the editing work is suspended, the creative thoughts of a writer may be adversely affected. In addition, the document element in the higher hierarchical level may not be available to edit. When editing works are performed in a distribution environment, the document main body may be unavailable physically (because of such as a network disconnection etc.). Thus, the collaborative editing works are disturbed.

To allow an editing work for dividing a section to be performed, the dependent relation of the document structure of an element to be checked out should be obtained before the element is edited. In addition, the editing work should be restricted corresponding to the dependent relation.

An SGML document is formed in a tree structure. Sister document elements (instances), which have the same parent document element (instance), may depend on each other corresponding to a related element declaration in a document type definition. Thus, to ensure the consistency of collaborative editing works, the dependency among the sister document elements should be obtained in advance. For example, when editing an instance of a type of document element that the DTD defines as being able to occur any number of times (including zero times), the instance can be divided into elements of the same type or be deleted. However, when the DTD defines a type of document element as occurring once, the instance of the type cannot be edited in such a manner.

To determine whether instances of a type of document element defined as occurring a plurality of times (at least once) can be deleted, it is necessary to check the number of instances of the type of document element, namely instances that have the same tag, and how many of them may be deleted by another editing work. For example,

```
<!ELEMENT PART(SECT)+> <!--PART is cornposed of one
or more SECTs-->
<PART id = p1>
    <SECT id = s1>First section </SECT>
    <SECT id = s2>Second section </SECT>
</PART>
```

In this document structure, one of document elements id=s1 and id=s2 can be deleted.

Such a restriction depends on not only the DTD, but also the results of other editing works that are being executed in parallel. The conventional SGML document managing apparatus, which examines the result of partial editing using the DTD for the entire SGML document (namely, it parses the result with the original DTD), cannot handle the restrictions of this kind. In other words, to enable local parsing of a result of partial editing, it is necessary to provide another editing restricting system or another partial editing DTD.

With respect to this point, the present invention automatically creates a partial editing DTD, which represents the restriction against partial editing, to enable local parsing of the result of partial editing. When a edited portion is checked out, the partial editing DTD is created by modifying the original DTD according to the restriction calculated from the existing document structure and other editing works executing in parallel at the time.

2) Insufficient revision history control of structural changes of a document

As another problem of the conventional technologies, a sufficient history of structural changes of an SGML document cannot be held. Conventionally, a history is held as transitions of individual document elements, and a history of structural changes such as a move operation and an exchange operation of document elements cannot be accurately held.

For example, the conventional revision history controller recognizes a divide operation of a document element as a partial delete operation of a document element and an append operation of a new document element. In addition, it recognizes an exchange operation of a document element as two sets of a delete operation and an append operation. Alternatively, it may record the histories of the divide operations, the exchange operations, or the like simply as the difference between the original document and the resultant document after these update operations. Although these update histories can recompose the resultant document from the original document, they cannot represent what the writer (s) intended to do exactly. Thus, the reliability of the updated history of the divided document elements and exchanged document elements decreases.

An apparatus that manages a history of structural changes has been proposed as Japanese Patent Laid-Open Publication No. 6-250895. However, in the apparatus, since information being managed is machine dependent, it cannot freely exchange history information of an SGML document with other applications.

SUMMARY Of THE INVENTION

The present invention is mainly intended to provide an SGML type document managing apparatus and an SGML type document managing method that allow collaborative creating and editing works to be effectively performed. It also improves the storage efficiency of management information and management efficiency by decreasing the number of types of management information.

The present invention provides an SGML type document managing apparatus for allowing users to create, edit, and use an SGML document collaboratively. It comprises a unit for automatically creating a partial editing document type definition corresponding to a partial editing request, and a unit for editing the requested portion of a document on the condition that the consistency of the document can be maintained with the partial editing document type definition. The partial editing document type definition is formed by modifying the original document type definition of an entire document so that it represents restrictions due to the editing state. The restrictions due to the editing state are calculated based on the existing document structure and influence of other editing processes executing in parallel at the time when the partial editing request is received. An example of a restriction is whether a document element can be appended before or after the portion to be edited.

According to the SGML type document managing apparatus of the present invention, a user can be edit a portion of a document independently so far as not to violate the partial editing document type definition, even delete the entire portion to be edited, append a new document element before/after the portion to be edited, or change a tag (generic identifier) of a document element in the highest hierarchical level of the portion to be edited if he/she made a reservation for those operations. Another user also can edit any other portions of the document in the same manner. Consequently, the work efficiency of collaborative editing work can be improved.

In addition, according to the present invention, a user can create a document by importing a portion of any revision of an existing document, so that the cost to create a document can be reduced.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a block diagram showing the structure of a document managing apparatus according to the present invention;

FIGS. 4A and 4B are schematic diagrams showing the relation between a fundamental structure of data and history information;

FIG. 5 is a schematic diagram showing an example of an original SGML document;

FIG. 7 is a schematic diagram showing an example of the structure of an extended content model;

FIGS. 13 and 14 are flowcharts showing a process for obtaining a portion of a document to be edited by a client;

FIGS. 20 and 21 are schematic diagrams showing an example of an SGML document with a history;

DESCRIPTION OF THE PREFERRED EMBODIMENT

Figure 2A:
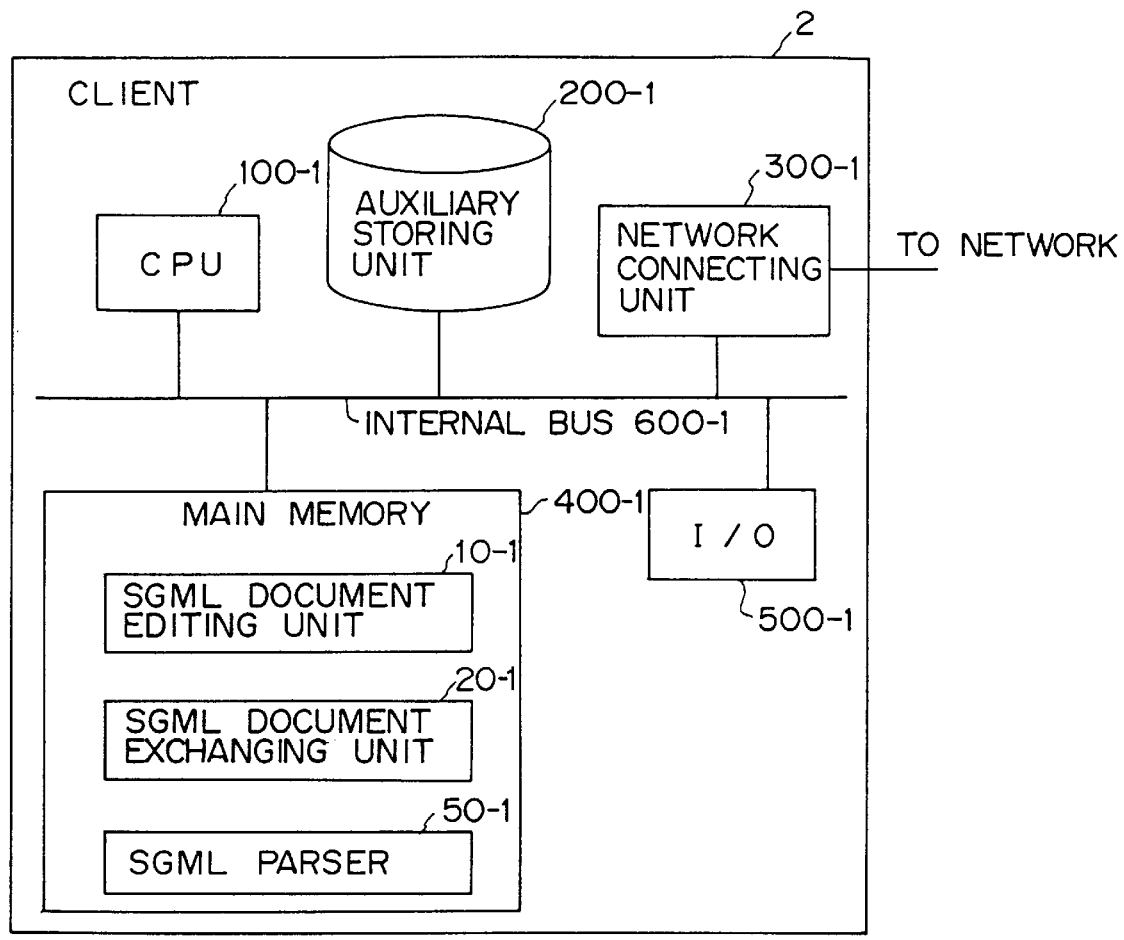
FIGS. 2A and 2B are block diagrams showing the structures of a client and a server of an information processing system.

An embodiment of the present invention is an SGML (Standard Generalized Markup Language) document managing apparatus that stores an SGML document, allows users to collaboratively create, edit, and use the SGML document, and manages a revision history and so forth. Principal features of the embodiment are:

System that stores and manages an SGML document as document elements, each of which is attached with the extended content model that is a variant of a content model of a element declaration in a document type definition (DTD) and represents the arrangement of child document elements of its relating document element with instance identifiers of the child document elements.

A system that automatically creates a partial editing document type definition corresponding to a portion to be edited of an SGML document so as to independently parse the portion to be edited.

A system that enables deletion of the entire portion to be edited, to add a new document element before/after the portion to be edited, and to change a tag (generic identifier) of a document element in the highest hierarchical level of the portion to be edited so far as not to violate the partial editing document type definition so that the consistency of the entire document be kept.

A system that stores a history of copy, move (exchange), append, and delete operations of document elements.

A system that outputs stored history information in a machine-independent format.

FIG. 1 is a block diagram showing the structure of the embodiment that accomplishes the above-described systems.

In FIG. 1, an SGML document managing system 1 comprises an SGML document editing unit 10, an SGML document exchanging unit 20, an SGML document accessing unit 30, an SGML document database 40, and SGML parsers 50-1 and 50-2.

When the present invention is accomplished by a server-client system, the SGML document editing unit 10 and the SGML document exchanging unit 20 are disposed in the client 2. On the other hand, the SGML document accessing unit 30, the database 40, and the SGML parser 50-2 are disposed in the server 3. The SGML parser 50-1 may be disposed in the client 2.

The SGML document editing unit 10 obtains a portion of the SGML document to be edited through the SGML document accessing unit 30 and edits the portion. The SGML document editing unit 10 includes a partial editing DTD consistency examining unit 11 and a history creating unit 12. The partial editing DTD consistency examining unit 11 calls the SGML parser 50-1 or 50-2 based on the partial editing DTD created by the SGML document accessing unit 30 so as to examine the consistency of the edited results. The history creating unit 12 stores changes of the contents of the document elements and the extended content models and creates a change history of contents and structure of the portion to be edited.

The SGML document exchanging unit 20 inputs and outputs an SGML document with/without history information to exchange with other SGML applications. The SGML document exchanging unit 20 performs a conversion between an SGML document type with a extended content model used in the present apparatus and either an SGML document type without history information or an SGML document type with history information separated from the SGML document.

The SGML document accessing unit 30 inputs and outputs a part of or an entire SGML document stored in the database 40 corresponding to a request from the client. In addition, the SGML document accessing unit 30 creates a partial editing DTD, manages the revisions of the SGML document, and saves/restores the SGML document.

The SGML document accessing unit 30 includes a document type converting unit 31, a partial editing DTD creating unit 32, a document type consistency examining unit 33, and a history managing unit 34. The document type converting unit 31 performs a conversion between an SGML document type with an extended content model and an internal format of the database 40. The partial editing DTD creating unit 32 creates a partial editing DTD. The document type consistency examining unit 33 calls the SGML parser 50-2 so as to examine the consistency of an input SGML document. The history managing unit 34 arranges a history information of document contents and extended content models.

The SGML parsers 50-1 and 50-2 are auxiliary units that examine the conformance of an SGML document to its DTD in place of other units. The function of the SGML parser 50-1 of the client 2 is the same as the function of the SGML parser 50-2 of the server 3. When the server and the client are different computers, they should use their own parsers physically different from each other to enable the client 2 to examine the result of partial editing locally (especially in the off-line state), or a common parser can be used if local parsing in the client 2 is unnecessary.

The SGML editing unit 10, the SGML document exchanging unit 20, and the SGML document accessing unit 30 can be accomplished by software stored in the main memories of the client and server rather than by dedicated hardware.

Figure 2B:
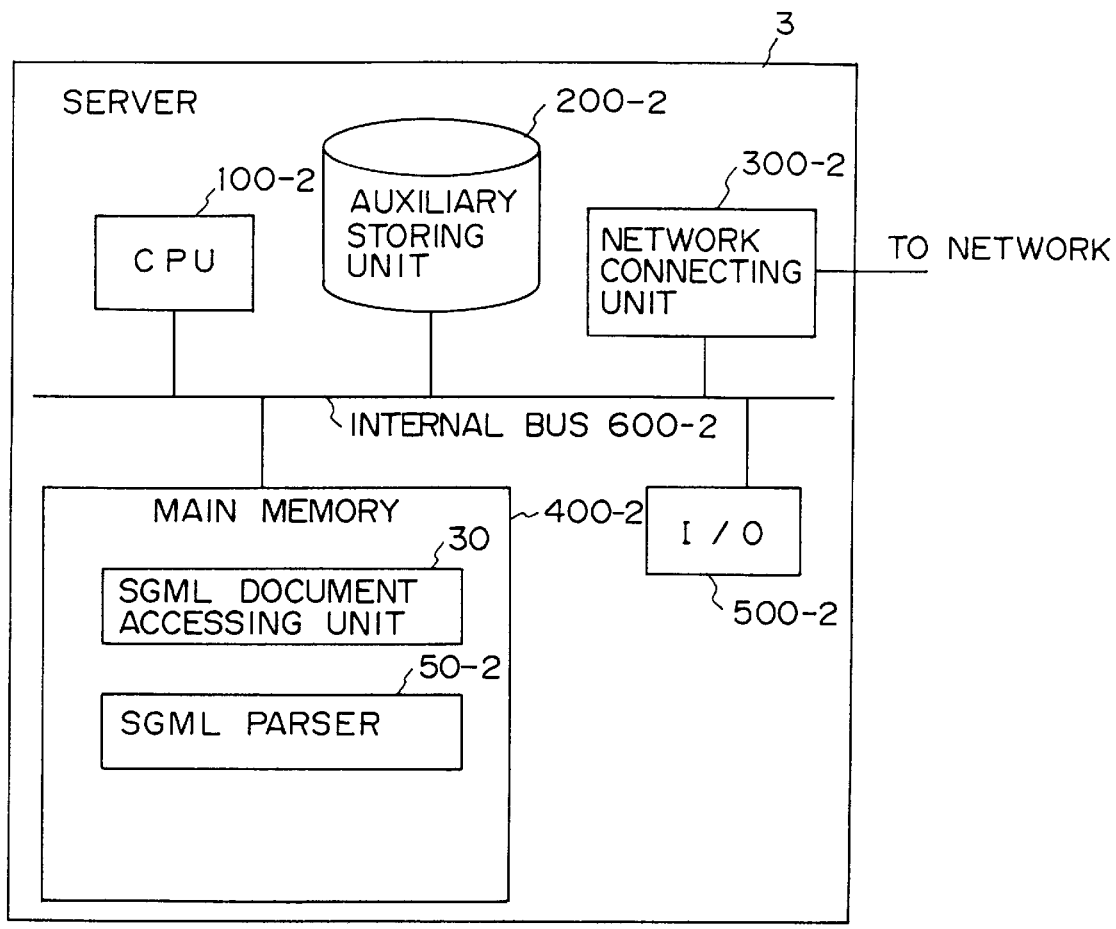

FIG. 2A is a block diagram showing the structure of the client 2 of the information processing system in the case the structure shown in FIG. 1 is accomplished by software. FIG. 2B is a block diagram showing the structure of the server 3 of the information processing system in the case that the structure shown in FIG. 1 is accomplished by software.

In FIGS. 2A and 2B, the client 2 and the server 3 comprise CPUs 100-1 and 100-2, auxiliary storing units 200-1 and 200-2, network connecting units 300-1 and 300-2, main memories 400-1 and 400-2, and input/output units 500-1 and 500-2, respectively. These units of the client 2 and the server 3 are connected with internal buses 600-1 and 600-2, respectively.

The CPUs 100-1 and 100-2 of the client 2 and the server 3 execute software that is stored in the main storing units 400-1 and 400-2, the software being read from the auxiliary storing unit 200-1 or the input/output units 500-1 and 500-2, or the software being obtained from the connecting network through the network connecting units 300-1 and 300-2, respectively. With the software, the functions of the SGML editing unit 10, the SGML document exchanging unit 20, and the SGML document accessing unit 30 are accomplished. The SGML parsers 50-1 and 50-2 are disposed in the main memories 400-1 and 400-2 or the auxiliary storing units 200-1 and 200-2, respectively.

The auxiliary storing units 200-1 and 200-2 are, for example, large capacity storing units such as hard disk units. The auxiliary storing unit 200-2 stores the database 40 and local files of the server 3. In addition, the auxiliary storing units 200-1 and 200-2 may store programs and data loaded to the main memories 400-1 and 400-2. Moreover, the auxiliary storing units 200-1 and 200-2 may store a partial editing DTD and a main document DTD.

The input/output units 500-1 and 500-2 are input/output units that are used in the client 2 and the server 3. Examples of the input/output units 500-1 and 500-2 are a keyboard, a pointing device, a display, a printer, and a disk driver. FIGS. 2A and 2B each show one input/output unit. However, the number of input/output units is not limited to one.

Figure 3:
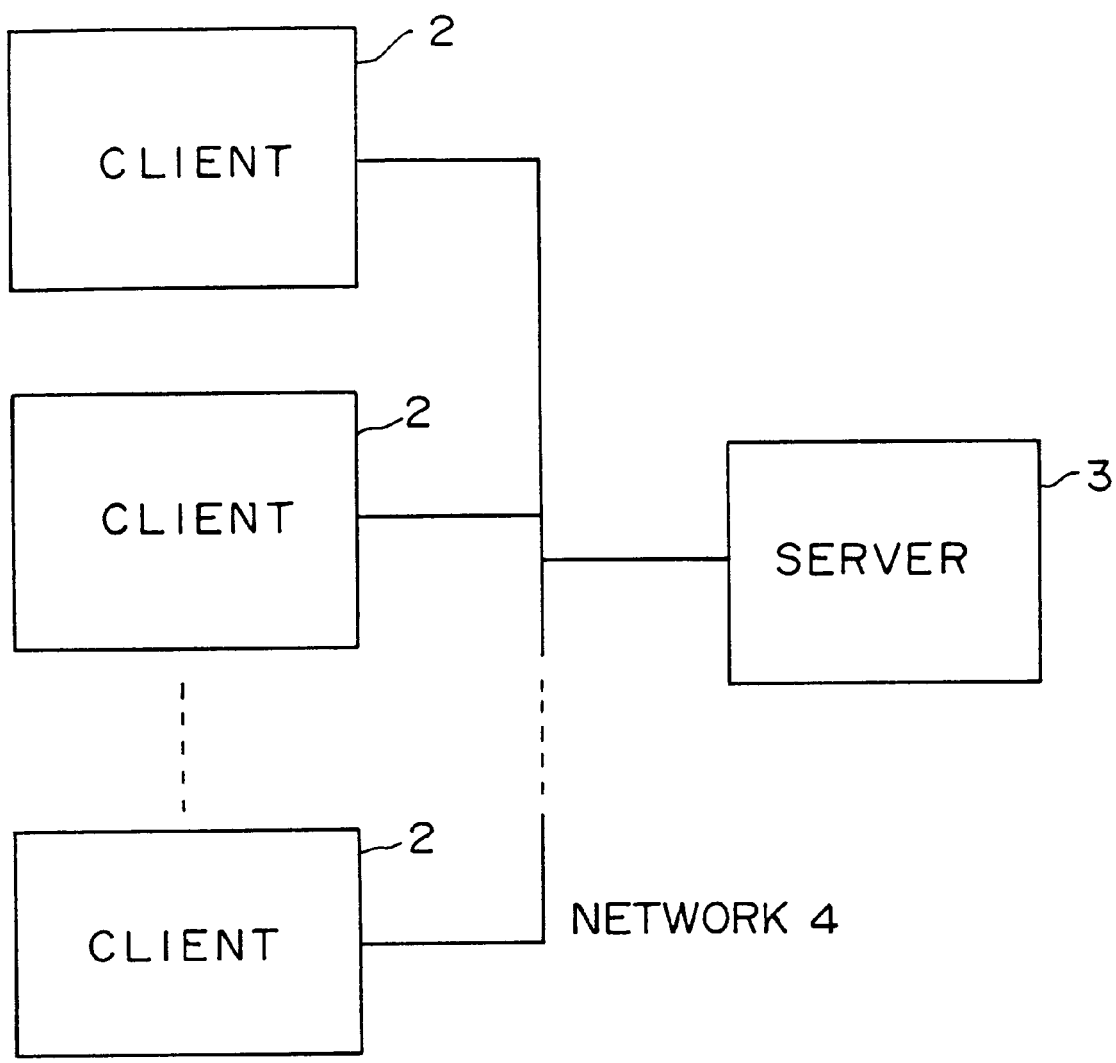
FIG. 3 is a schematic diagram showing the structure in which a plurality of clients are connected to one server.

In the structure shown in FIG. 1, one client 2 and one server 3 are disposed. However, as shown in FIG. 3, one server 3 may be connected to a plurality of clients 2 through a network such as a LAN so that many users can collaboratively create, edit and revise a large SGML document, according to the present invention. In this case, when each client 2 has an SGML parser 50-1, while the client 2 is editing a document, it does not exclusively use the network 4.

Unlike with the structure in which the document managing apparatus 1 is divided into the client 2 and the server 3 as shown in FIG. 1, the document managing apparatus 1 can be disposed as one unit. In this case, the document managing apparatus 1 has one SGML parser.

Next, an embodiment of the present invention will be described in detail.

FIGS. 4A and 4B are schematic diagrams showing the fundamental structure of data according to the embodiment of the present invention. In FIGS. 4A and 4B, solid lines with arrows represent the relations of identifiers. The data dealt with in the embodiment is categorized as information of the entire document and information of document elements (instances).

The information of the entire document shown in FIG. 4A includes system management information for operating and managing the document, profile information for representing the characteristics of the document, and document history information.

The information of each document element shown in FIG. 4B includes identifier information, SGML information, history information, and system management information for access control for each element. The identifier information correlates the information of a particular document element with those of other document elements and represents the document structure as a whole. The SGML information of a particular document element comprises a tag, attributes, and information on the immediate lower hierarchical level of the document element, namely contents (character data) or the extended content model of the document element.

Each element of a document is stored in the database 40. Each element is assigned an instance identifier and managed. An instance identifier is logically composed of a document identifier that identifies a version of a document and an element identifier that identifies a document element.

A document identifier is uniquely assigned to a particular (independent) version of a particular document.

An element identifier is uniquely assigned to a document element (instance) of a particular document. The element identifier is applicable for an ID attribute of the SGML, which is used for hypertextual links among document elements by an SGML application.

Each element that has been revised is correlated with an element (sequence) of the former revision(s), by using an instance identifier and a revision number. A revision number is an identification value uniquely assigned to a revision work as a particular revision of a particular document. The revision number also represents the revision order. In practice, when a document element is checked in, the system automatically assigns a revision number to the document element.

Stored elements are linked with instance identifiers so as to structure an SGML document. The links that represent a local document structure around a particular document element are correlated with a content model in the DTD and stored as an extended content model. These links are also used to manage a revision history of a document structure and to calculate the restriction of a partial editing. An extended content model is formed by assigning one or more existing SGML document elements (instance identifiers) to every element in a content model and adding an element removability indicator (representing the number of existing document elements that can be deleted) to a repeatable document element in a content model (See FIG. 7, described later).

Figure 6:
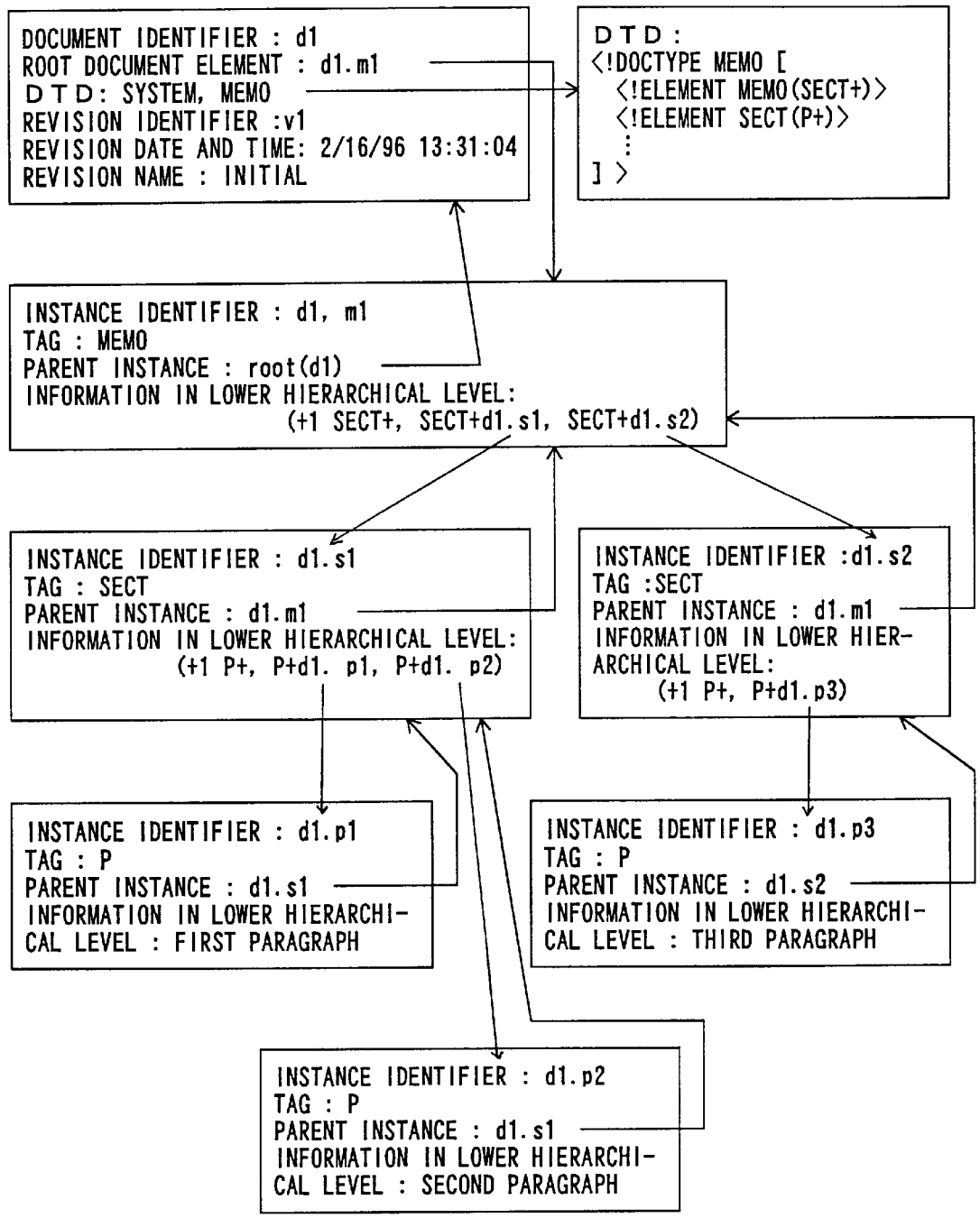
FIG. 6 is a schematic diagram showing a stored example of an SGML document.

With reference to FIGS. 5 and 6, an example for storing an SGML document in the present apparatus will be described.

FIG. 5 is a schematic diagram showing an original document of an SGML document that is input to the SGML document managing apparatus 1 according to the embodiment. FIG. 6 is a schematic diagram showing an example for storing the SGML document shown in FIG. 5. In FIGS. 5 and 6, only principal portions such as the structure of stored information shown in FIG. 4 are listed. An original document as an SGML document shown in FIG. 5 is converted into internal data by the SGML document exchanging unit 20. The internal data is stored in the database 40 as data with the structure as shown in FIG. 6 through the SGML document accessing unit 30.

In the SGML document shown in FIG. 5, "<>" represents a tag. The original document of the SGML document is composed of two sections (SECs). The first section is composed of two paragraphs (Ps). The second section is composed of one paragraph.

FIG. 7 is a schematic diagram showing the structure of the above-described extended content model in Backus-Naur form (BNF) corresponding to the format according to the embodiment. The BNF does not represent occurrences of item separators, which usually comprise one or more spaces, for simplicity.

When a content model includes "ANY" or "#PCDATA" and it corresponds to some sub-structural parts of a document, a management level of the sub-structure can be selected as follows: each element in the sub-structure is individually stored and managed, or the sub-structural parts are stored as a whole and managed regardless of the sub-structure. ("ANY" and "#PCDATA" are reserved words defined in the SGML specification. "ANY" represents a content type including all content models. "#PCDATA" represents character data whose syntax has been analyzed.) For example, emphasized words or phrases that are marked up as included elements, which can occur in any sub-elements (generally "#PCDATA" parts) of a specific element, are not stored individually, but stored and managed with surrounding data as a (parsed) string. Instead, elements in higher hierarchical levels such as paragraphs can be stored individually and managed.

In the document managing apparatus according to the embodiment, it is possible to import a document element (or a sub-tree of document elements) from any revision of an existing document into a document to be edited. The import mode is categorized as the share mode, independent mode, or link mode. In the share mode, original elements can be changed. In the independent mode, original elements cannot be changed. In the link mode, any changes are not permitted.

In the share mode and link mode, an element being imported is correlated with its original element through a particular document element to link them. A document element to link imported elements with their source elements is introduced corresponding to a sub-tree of document elements imported from another document. It contains an instance identifier and a revision number of the element in the highest hierarchical level of an imported sub-tree and a relation table of element identifiers of the elements in the sub-tree, but no other information on the individual elements in the sub-tree. In other words, it does not include information on the individual elements in an imported sub-tree, namely the structure and contents of the sub-tree, but has a pointer indicating the location where the information of the individual elements is stored. The relation table of element identifiers is used so that an ID in an imported portion can be referred to from another portion of an imported document. In the independent mode, each element to be imported is copied and correlated with original elements corresponding to the history information.

[1] Partial editing DTD

In the present invention, a portion of a document can be edited independently with another editing work. The portions that can be edited at once should be a sub-tree or sequence of sub-trees of document elements. In other words, the highest hierarchical level of a portion being edited comprises a document element or a sequence of document elements that have a common parent element. At this point, to independently examine the consistency of a portion being edited, the SGML document accessing unit 30 supplies a partial editing DTD created with an extended content model to the SGML document editing unit 10.

A partial editing DTD is a DTD declared with a temporary document type name that is generated for partially editing a document. An element declaration of the generated document type name, namely the element declaration of the root document element of a portion to be edited, is added to declarations in the DTD of the entire document. The element declaration of the root document element is created by modifying an original content model corresponding to a portion to be edited, especially by changing occurrence indicators in it, and represents the append-possibility corresponding to an append-reservation (that will be described later) and the delete-probability corresponding to a delete-reservation (that will be described later) of elements.

Examples of occurrence indicators are "*", "?", and "+". "*" represents that a relevant element can occur any number of times (including zero times). "?" represents that a relevant element occurs once or can be omitted. "+" represents that a relevant element occurs more than once.

FIG. 7 is a schematic diagram showing an example of the structure of an extended content model.

An extended content model comprises an extended model group and optionally exceptions. The exceptions comprise inclusions and exclusions. The inclusions declare included elements that can be inserted anywhere in an instance of the document element the content model has declared. The exclusions declare excluded elements that are prohibited from occurring anywhere in an instance of the document element. An extended model group comprises extended model list and/or repeatable model groups. A repeatable model group corresponds to an element or model group with a REP ("*") or PLUS ("+") occurrence indicator in the original DTD. It comprises a removable instance number, a tag/model group with an occurrence indicator, and an extended model list that represents a sequence of document elements existing in a real document. An extended model list represents a possible/existing occurrence of elements. It comprises primitive extended content tokens delimited with connectors of one kind. A primitive extended content token is a generic identifier (tag) with/without an occurrence indicator, attached with an instance identifier of the corresponding document element, if it exists.

An extended content model is not essential for creating a partial editing DTD. However, it reduces the cost of calculating a restriction against editing in the highest hierarchical level of a portion to be edited. In other words, when an extended content model is held, the calculation time need to correlate document elements in the highest hierarchical level of the portion to be edited is saved by referencing the extended content model.

(1) Ensuring independence of partial editing

According to the present invention, when an SGML document is collaboratively created, an exclusive control operation is performed by checking in and checking out the document to be edited so as to prevent partial editing works from conflicting. A append-/delete-reservation system is also used for a variable occurrence type element that occurs a limited number of times (an element that corresponds to a token with an occurrence indicator in a content model) which is to be deleted or appended, in the case that a variable occurrence type element as well as an included element can be appended or deleted independently from another document element in the same level of an SGML document (namely, in an immediate lower hierarchical level of a particular document element).

According to the present invention, the possibility of which document elements will be appended and/or deleted is analyzed in advance. The present invention allows a variable occurrence type element or an included element to be appended before or after a portion to be edited so far as not to violate the DTD. It also allows the entire edited portion to be deleted when all elements in the highest hierarchical level of a portion to be edited are variable occurrence type elements and/or included elements. The delete-reservation and the append-reservation prevent these operations from conflicting.

When a document element (sequence) in the highest hierarchical level of a portion to be edited corresponds to a token in a model list connected with OR (|), its tag can be changed into an alternative declared in the model. The present invention also allows this operation by referring to the restriction calculated and applied to a partial editing DTD in advance.

(2) Creating partial editing DTD

Figure 8:
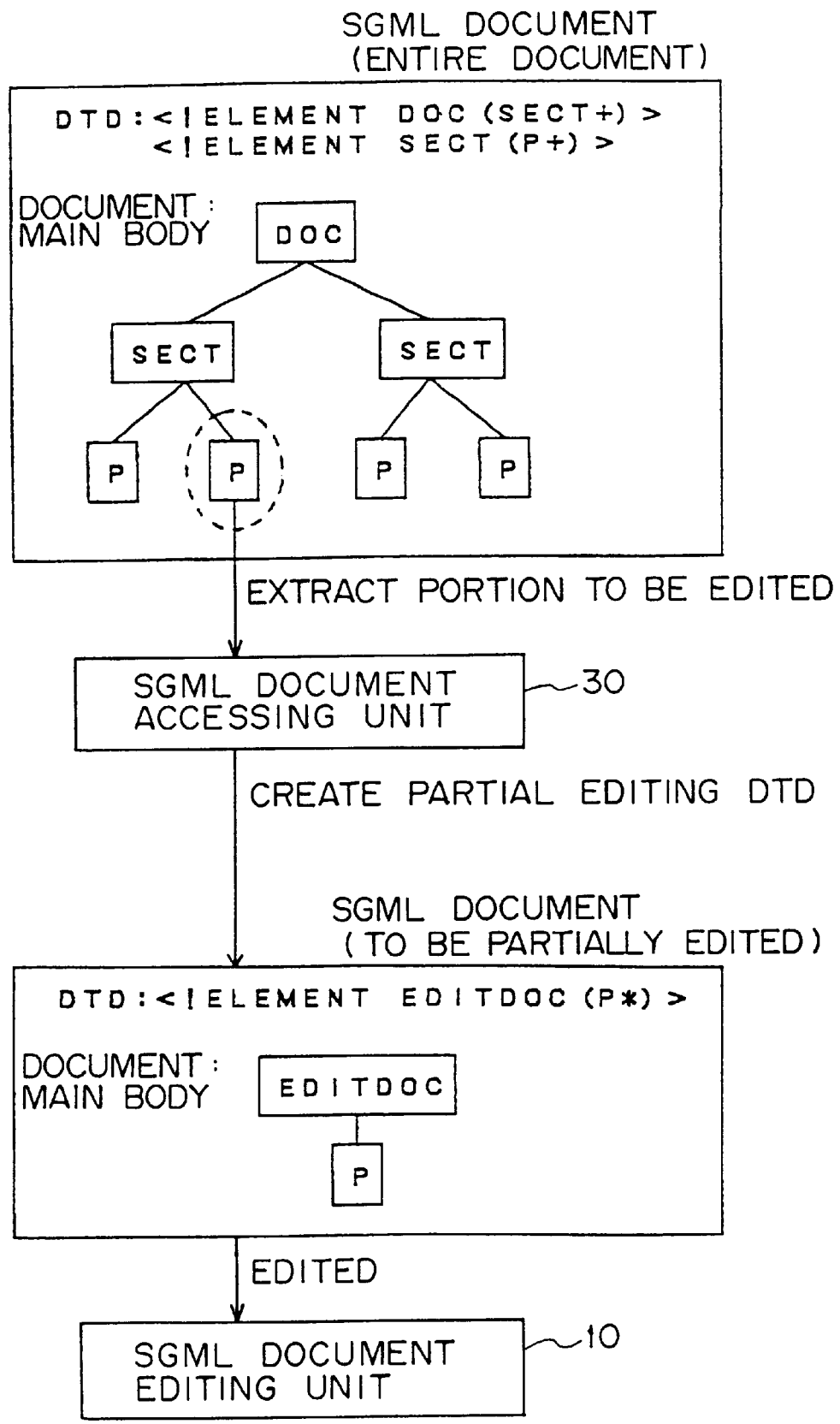
FIG. 8 is a schematic diagram showing an example of creating a partial editing DTD.

FIG. 8 is a schematic diagram for explaining an example of creating a partial editing DTD.

In FIG. 8, an SGML document is of the DOC type. The DOC is composed of several SECTs (sections). Each SECT is composed of several Ps (paragraphs). When a user wants to edit the second P of the first SECT, the SGML document accessing unit 30 extracts the portion to be edited (namely, the second P of the first SECT) and creates a partial editing DTD that represents restrictions for partial editing, by modifying the original DTD of the document. The portion to be edited and the partial editing DTD are supplied to the SGML document editing unit 10.

In the example shown in FIG. 8, when the DTD of the SGML document (entire document) is:

<!ELEMENT DOC (SECT+)>
<!ELEMENT SECT (P+)>

The partial editing DTD created by the SGML document accessing unit 30 is:

<!ELEMENT EDITDOC (p*)>

The partial editing DTD has a temporary document type name EDITDOC, and declares that any number of Ps are permitted under the EDITDOC ("*" is an occurrence indicator that represents that P can occur any number of times). In other words, the element extracted from the original document to be edited, namely the second P, can be deleted and any number of elements with P tags can be appended. Since the extracted portion to be edited corresponds to "P+" (where+represents that P can occur once or more times) and another element out of the portion also corresponds to it, the consistency has been ensured.

(3) Appending/deleting a document element and changing a tag

Next, with reference to FIGS. 9 to 12, examples of appending/deleting a document element in the highest hierarchical level of a portion to be edited and of changing a tag will be described. DTDs in FIGS. 9 to 12 show only structural portions.

Figure 9A:
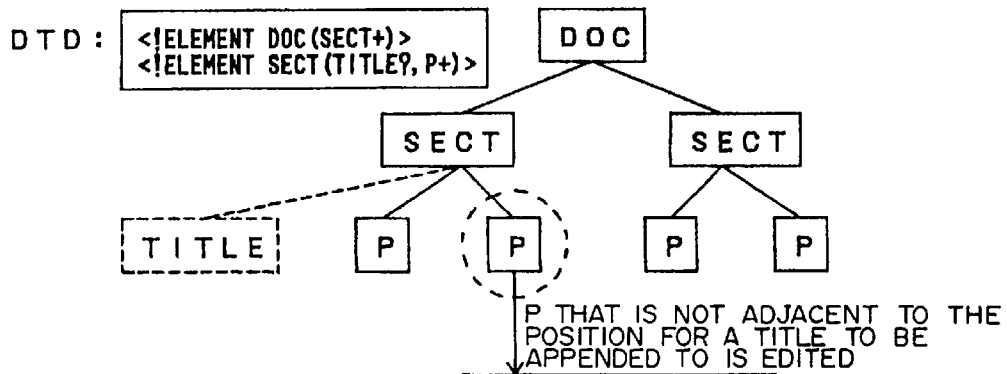
FIGS. 9A, 9B, and 9C are schematic diagrams for explaining examples of determining whether or not a document element can be appended.
Figure 9B:
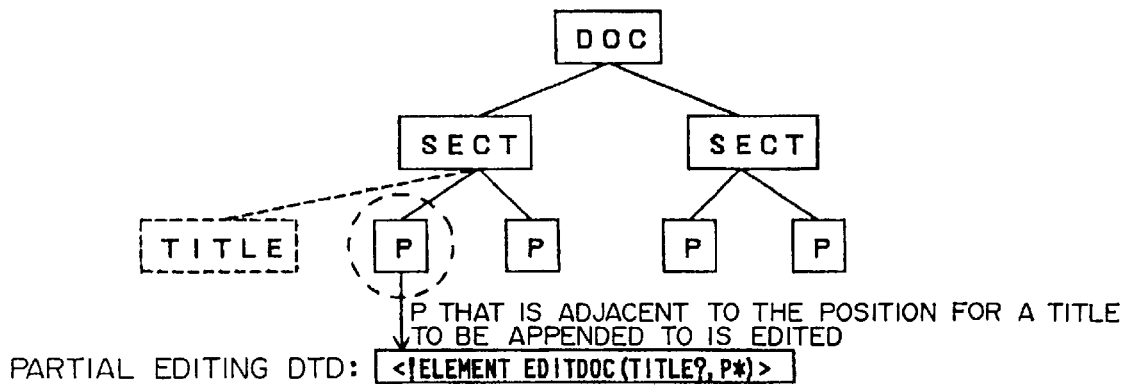
Figure 9C:
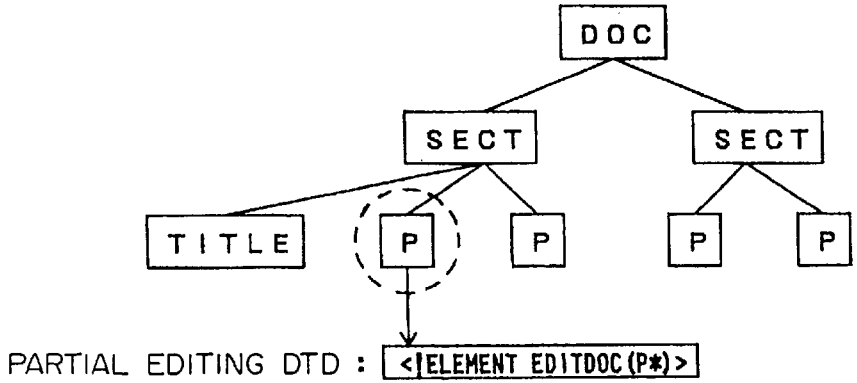

FIGS. 9A, 9B, and 9C are schematic diagrams for explaining examples of determining whether or not an element can be appended before or after an element to be checked out as a portion to be edited.

An element that can be appended in the highest hierarchical level of a portion to be edited is a variable occurrence type element or an included element. When a portion to be edited is adjacent to a position corresponding to one of these types of element, elements of the type can be appended without a violation of the DTD.

In FIG. 9A, assume that the DTD of the SGML document (entire document) is:

<!ELEMENT DOC (SECT+)>
<!ELEMENT SECT (TITLE?, P+)>

FIG. 9A shows a case that a document does not have a TITLE and the target of editing is the second P, which is not adjacent to the position for a TITLE to be appended to. FIG. 9B shows a case that a document does not have a TITLE and the target of editing is the first P, which is adjacent to the position for a TITLE to be appended to. FIG. 9C shows a case that a document has a TITLE.

When a document to be edited does not have a TITLE, a TITLE can be appended if a portion to be edited includes a P adjacent to the position for a TITLE to be appended to (in this example, the first P). FIG. 9B shows this case. In FIG. 9A, since the P to be edited is not adjacent to the position for a TITLE to be appended to, no TITLE can be appended. In FIG. 9C, since the document has a TITLE and it can include at most one TITLE, another TITLE cannot be appended.

In FIG. 9A, since the portion to be edited (the second P) is not adjacent to the position for a TITLE to be appended to, a partial editing DTD to be created is:

<!ELEMENT EDITDOC (P*)>

Thus, partial editing cannot append a TITLE, but can change the number of Ps without restriction.

In FIG. 9B, since the portion to be edited (the first P) is adjacent to the position for a TITLE to be appended to, a partial editing DTD to be created is:

<!ELEMENT EDITDOC (TITLE?, P*)>

Thus, partial editing can append a TITLE and change the number of Ps without restriction.

In FIG. 9C, since the document has a TITLE, a partial editing DTD to be created is:

<!ELEMENT EDITDOC (P*)>

Thus, partial editing cannot append a TITLE, but can change the number of Ps without restriction.

Figure 10A:
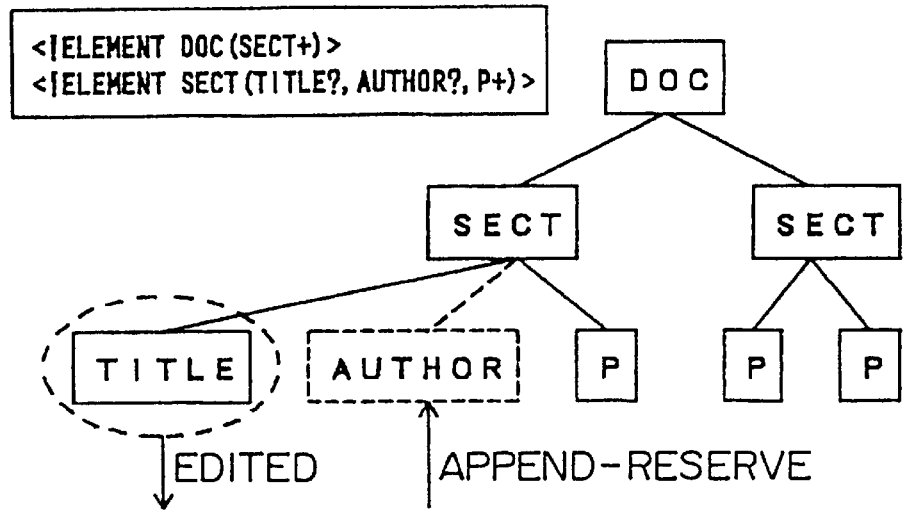
FIGS. 10A and 10B are schematic diagrams for explaining examples in which a document element is append-reserved.
Figure 10B:
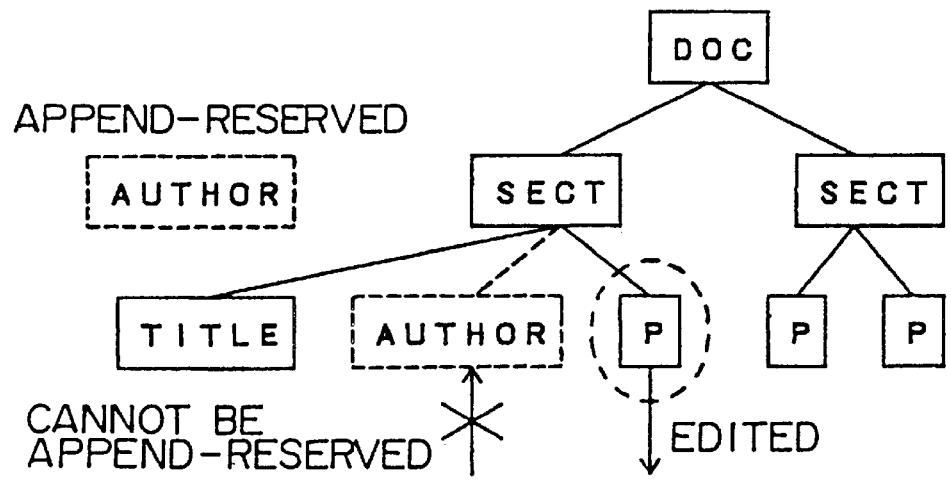

FIGS. 10A and 10B are schematic diagrams for explaining examples of append-reservation suppressing of a conflict caused by appended elements in different editing works.

Assume that the DTD of an SGML document (entire document) is:

<!ELEMENT DOC (SECT+)>
<!ELEMENT SECT (TITLE?, AUTHOR?, P+)>

An instance of an element type that has an upper limit of the number of occurrences can be appended only when the original document to be edited has less than the limit number of instances of the element type. In an SGML document, an instance of an element type declared with an OPT (optional) occurrence indicator "?", namely an element type declared as to occur at most once, can be appended only when the original document to be edited has no instance of the element type. Append-reservation with check out enables this type of element to be appended safely. An element that has been append-reserved cannot be appended by another editing work.

In the initial state as shown in FIG. 10A, since the first SECT has no AUTHOR, partial editing of the TITLE or the first P, either of which is adjacent to a position for an AUTHOR to be appended to, can append an AUTHOR. In the next state shown in FIG. 10B, where someone else is editing the TITLE with an append-reservation of an AUTHOR, another user cannot append an AUTHOR even if he/she is editing the first P because no other append-reservation of an AUTHOR is permitted.

In other words, when one user requests the check out of the TITLE and the append-reservation of an AUTHOR in the initial state shown in FIG. 10A, a partial editing DTD as follows will be created:

<!ELEMENT EDITDOC (TITLE, AUTHOR?, P*)>

Thus, it is permitted to append an AUTHOR and any number of Ps, as well to edit the TITLE.

In FIG. 10B, when another user requests the check out of the first P while the TITLE is being edited, since the AUTHOR has been already append-reserved, a partial editing DTD as follows will be created:

<!ELEMENT EDITDOC (P+)>

Thus, it is permitted to modify or delete the checked-out P and to append any number of Ps, but not to append an AUTHOR.

Figure 11A:
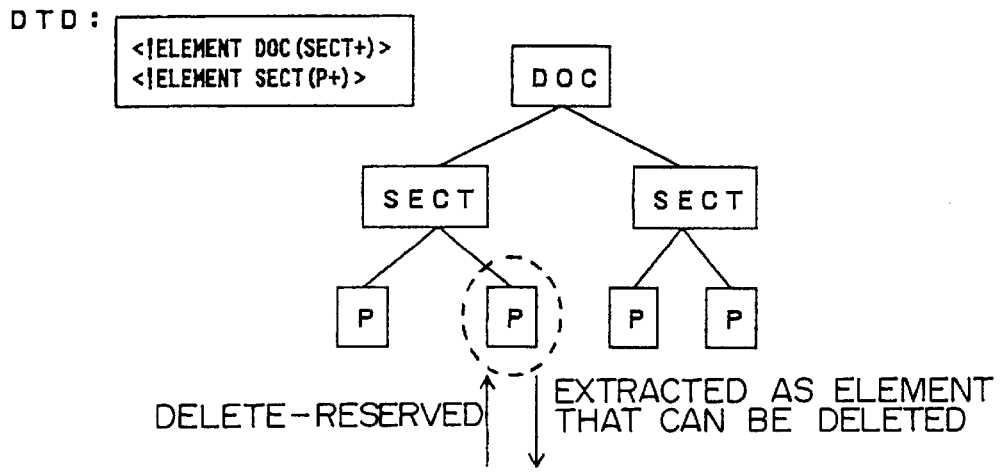
FIGS. 11A and 11B are schematic diagrams for explaining examples in which a document element is delete-reserved.
Figure 11B:
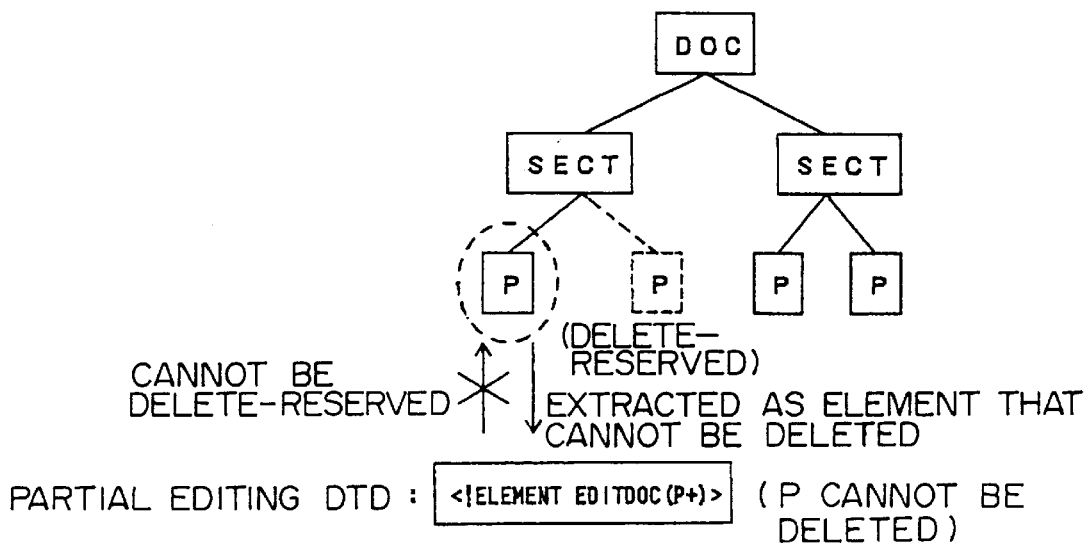

FIGS. 11A and 11B are schematic diagrams for explaining examples of delete-reservation suppressing of a conflict caused by editing deletion in different editing works.

Assume that the DTD of an SGML document (entire document) is:

<!ELEMENT DOC (SECT+)>
<!ELEMENT SECT (P+)>

An instance of an element type that has a lower limit of the number of occurrences can be deleted only when the document to be edited has more than the limit number of instances of the element type. In an SGML document, an instance of an element type declared with a PLUS occurrence indicator "+", namely an element type declared as occurring one or more times, can be deleted only when the original document to be edited has two or more instances of the element type. Delete-reservation enables instances of this type of element to be deleted safely. The delete-reservation of an element instance is accepted only when the number of instances of the element type excluding those that have been delete-reserved is two or more times.

In the initial state shown in FIG. 11A, since the first SECT (section) has two Ps (paragraphs), one of them can be deleted. When the second P is delete-reserved and checked out, a partial editing DTD to be created becomes:

<!ELEMENT EDITDOC (P*)>

Thus, it is permitted to delete the P extracted from the document for partial editing.

In the next state shown in FIG. 11B, where the second P of the first SECT is edited by someone else with a delete-reservation, since only a P is left unreserved in the first SECT, delete-reservation of the first P of the SECT cannot be made. Thus, when the first P of the first SECT is partially edited, a partial editing DTD to be created becomes:

<!ELEMENT EDITDOC (P+)>

Thus, the first P cannot be deleted.

The above-described append-reservation and delete-reservation are requested by the SGML document editing unit 10 to the SGML document accessing unit 30 generally at the same time as checking out. However, they can be additionally requested in the middle of partial editing.

Figure 12:
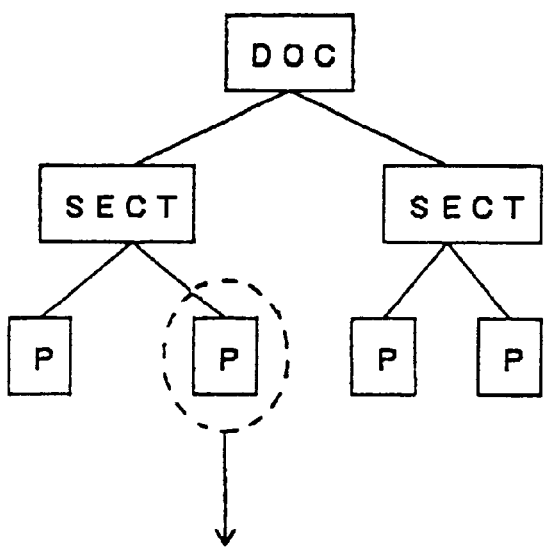
FIG. 12 is a schematic diagram for explaining an example in which a tag of a document element in the highest hierarchical level is changed.

FIG. 12 is a schematic diagram for explaining an example for changing a tag of an element in the highest hierarchical level of a portion to be edited.

In FIG. 12, the DTD of an SGML document (entire document) is:

<!ELEMENT DOC (SECT+)>
<!ELEMENT SECT (P|LIST)+>
<!ELEMENT LIST (ITEM+)>

Suppose the second P of the first SECT is being edited, since the document element in the highest hierarchical level of a portion to be edited, namely the P, corresponds to a token in a model list connected with OR (|), it can be substituted with a LIST structure (the alternative declared in the DTD).

In this case, a partial editing DTD to be created becomes:

<!ELEMENT EDITDOC (P|LIST)*>
<!ELEMENT LIST (ITEM+)>

Thus, the P can be substituted with a LIST.

Figure 14:
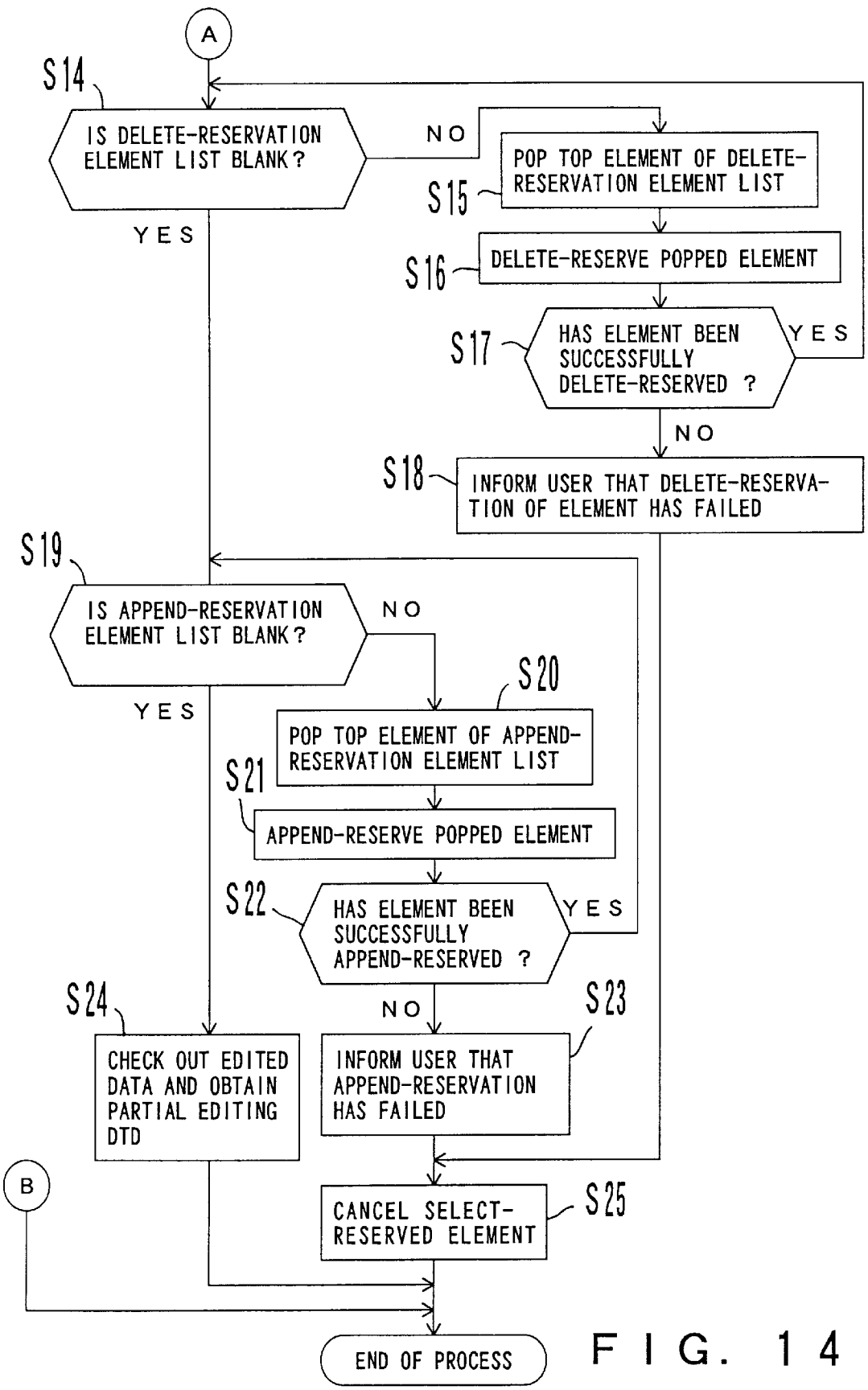

FIGS. 13 and 14 are flowcharts showing a process for obtaining a portion to be edited from a document. This process is performed by the client 2.

At step S1 shown in FIG. 13, the SGML document editing unit 10 of the client 2 prompts the user to select one or more elements to be edited.

At step S2, the SGML document editing unit 10 select-reserves the selected elements so that another user may not edit them at the same time.

At step S3, the SGML document editing unit 10 determines whether or not the element has been successfully select-reserved. When the determined result at step S3 is Yes, the flow advances to step S4. When the determined result at step S3 is No, the flow advances to step S13.

At step S4, the SGML document editing unit 10 obtains a list of append-/delete-reservation option elements from the server 3. The list includes elements that are adjacent to the portion to be edited and that can be appended or deleted. The list is created by the server 3 corresponding to a process shown in FIGS. 17 and 18.

At step S5, the SGML document editing unit 10 clears the append-/delete-reservation element list.

At step S6, the SGML document editing unit 10 determines whether or not the reservation option element list is blank. When the determined result is No, the flow advances to step S7. When the determined result is Yes, the flow advances to step S14 (see FIG. 14).

At step S7, the SGML document editing unit 10 outputs append-/delete-reservation option elements and prompts the user to select one of them.

At step S8, the SGML document editing unit 10 determines which element the user has selected. When the selected element is an append-reservation option element, the flow advances to step S9. When the selected element is a delete-reservation option element, the flow advances to step S10. When the user has not selected an element, the flow advances to step S14 (see FIG. 14).

At step S9, the SGML document editing unit 10 appends the selected element to the append-reservation element list. Thereafter, the flow advances to step At step S10, the SGML document editing unit 10 appends the element selected at step S8 to the delete-reservation element list. Thereafter, the flow advances to step S11.

At step S12, the SGML document editing unit 10 deletes the selected element from the append-/delete-reservation option list.

At step S12, the SGML document editing unit 10 determines whether or not the reservation option element list is blank. When the determined result at step S12 is Yes, the flow advances to step S14 (see FIG. 14). When the determined result at step S12 is No, the flow returns to step S7.

At step S13, the SGML document editing unit 10 informs the user of the reason why the element could not be select-reserved at step S3. Thereafter, the SGML document editing unit 10 terminates the process.

At step S14 shown in FIG. 14, the SGML document editing unit 10 determines whether or not the delete-reservation element list is blank. When the determined result at step S14 is No, the flow advances to step S15. When the determined result at step S14 is Yes, the flow advances to step S19.

At step S15, the SGML document editing unit 10 pops the top element of the delete-reservation element list. In this context, to pop means to obtain an element from a list and at the same time to delete it from the list. Namely, the SGML document editing unit 10 obtains the element from the list and deletes it therefrom.

At step S16, the SGML document editing unit 10 delete-reserves the element that has been popped.

At step S17, the SGML document editing unit 10 determines whether or not the element has been successfully delete-reserved. When the determined result at step S17 is Yes, the flow returns to step S14. When the determined result at step S17 is No, the flow advances to step S18.

At step S18, the SGML document editing unit 10 informs the user that the delete-reservation of the element has failed.

At step S19, the SGML document editing unit 10 determines whether or not the append-reservation element list is blank. When the determined result is No, the flow advances to step S20. When the determined result at step S19 is Yes, the flow advances to step S24.

At step S20, the SGML document editing unit 10 pops the top element of the append-reservation element list.

At step S21, the SGML document editing unit 10 append-reserves the popped element.

At step S22, the SGML document editing unit 10 determines whether or not the element has been successfully append-reserved. When the determined result at step S22 is Yes, the flow returns to step S19. When the determined result at step S22 is No, the flow advances to step S23.

At step S23, the SGML document editing unit 10 informs the user that the append-reservation of the element has failed.

At step S25, the SGML document editing unit 10 cancels the select-reservation and completes the process.

At step S24, the SGML document editing unit 10 checks out the edited data and obtains the partial editing DTD from the client 3, and completes the process.

Figure 15:
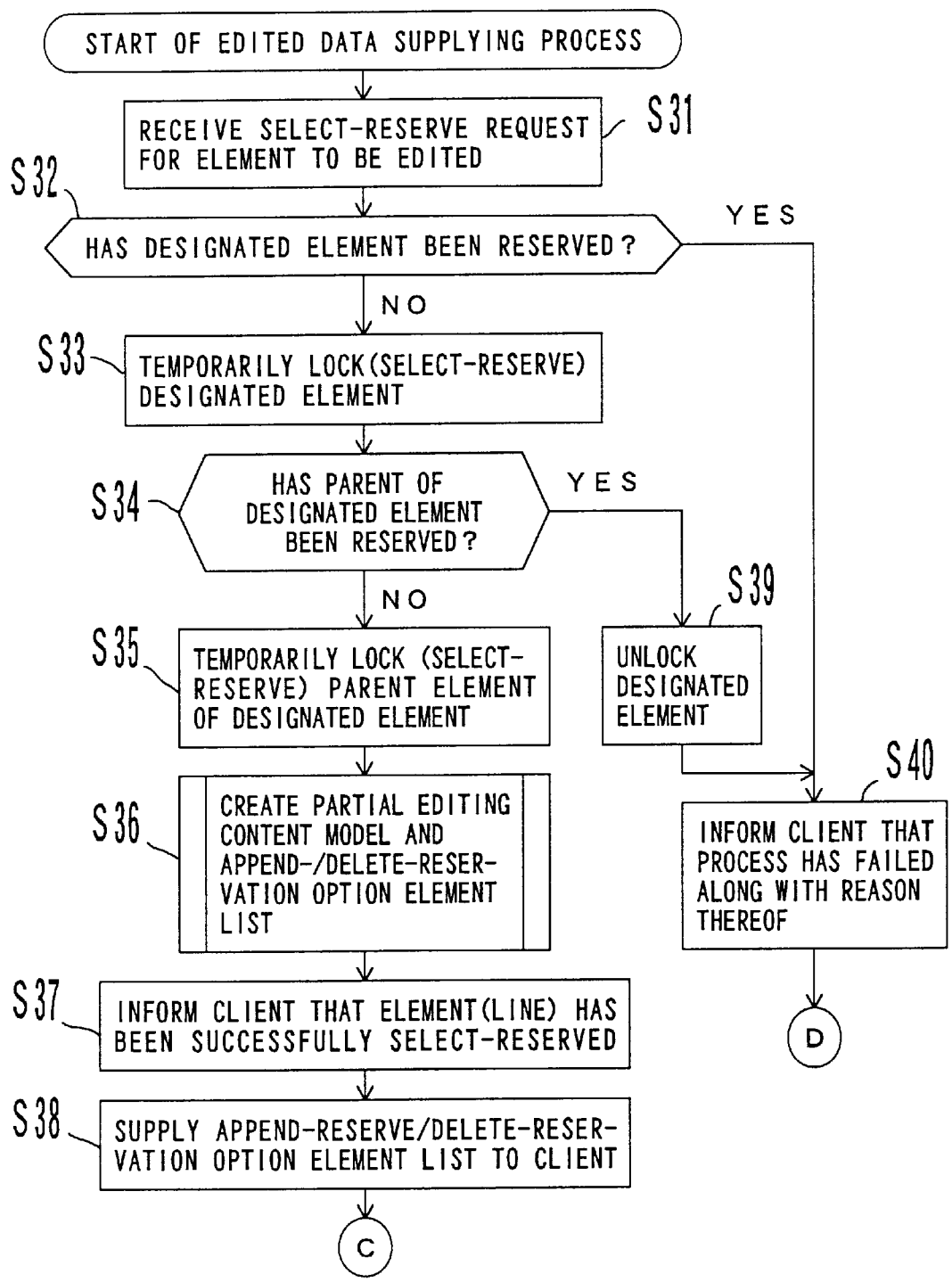
FIGS. 15 and 16 are flowcharts showing a process for supplying a partial editing DTD and edited data.
Figure 16:
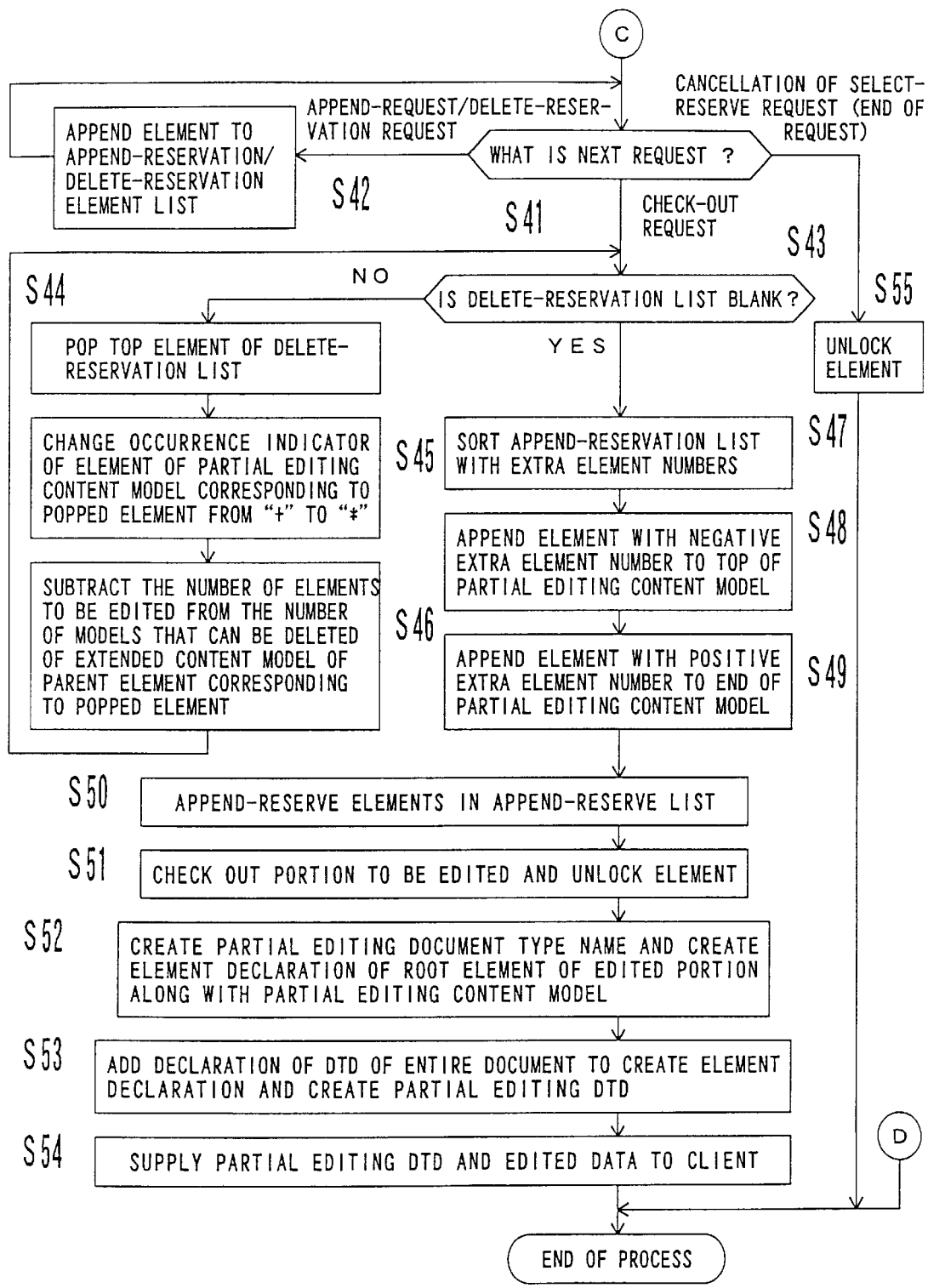

FIGS. 15 and 16 are flow charts showing a process of the server 3 for supplying a partial editing DTD and edited data corresponding to a request issued by client 2.

At step S31 shown in FIG. 15, the SGML document accessing unit 30 of the server 3 receives a select-reservation request for one or more elements to be edited.

At step S32, the SGML document accessing unit 30 determines whether or not the designated element or element sequence containing a plurality of elements has been already reserved by another request. When the determined result at step S32 is Yes, the flow advances to step S40. When the determined result at step S32 is No, the flow advances to step S33.

At step S33, the SGML document accessing unit 30 temporarily locks (makes a select-reservation of) the designated element (sequence).

At step S34, the SGML document accessing unit 30 determines whether or not a parent element (sequence) of the designated element (sequence) has been already reserved by another request. When the determined result is Yes, the flow advances to step S39. When the determined result is No, the flow advances to step S35.

At step S35, the SGML document accessing unit 30 temporarily locks (makes a select-reservation of) a parent element (sequence) of the designated element (sequence).

At step S36, the SGML document accessing unit 30 creates a partial editing content model, which will be used in the element declaration of the root document element of a portion to be edited, and an append-/delete-reservation option element list (that will be described later).

At step S37, the SGML document accessing unit 30 informs the client 2 that the designated element (sequence) has been successfully select-reserved.

At step S38, the SGML document accessing unit 30 supplies the append-/delete-reservation option element list to the client 2. Thereafter, the flow advances to step S41.

At step S39, the SGML document accessing unit 30 unlocks (cancels the select-reservation of) the designated element(s).

At step S40, the SGML document accessing unit 30 informs the client 2 that the process has failed along with the reason thereof. Thereafter, the SGML document accessing unit 30 terminates the process.

At step S41 shown in FIG. 16, the SGML document accessing unit 30 determines what the next request is. When the next request is an append-/delete-reservation request, the flow advances to step S42. At step S24, the client 2 checks out the designated element(s). When the next request is a check-out request, the flow advances to step S43. When the next request is a cancellation of the select-reservation request (end of request), the flow advances to step S55.

At step S42, the SGML document accessing unit 30 appends the element (sequence) that has been append-reserved or delete-reserved to the append-reservation element list or the delete-reservation element list, respectively. Thereafter, the flow returns to step S41.

At step S43, the SGML document accessing unit 30 determines whether or not the delete-reservation element list is blank. When the determined result at step S43 is No, the flow advances to step S44. When the determined result at step S43 is Yes, the flow advances to step S47.

At step S44, the SGML document accessing unit 30 pops the top element of the delete-reservation element list.

At step S45, the SGML document accessing unit 30 changes an occurrence indicator of a token in a partial editing content model corresponding to the popped element from "+" to "*".

At step S46, the SGML document accessing unit 30 subtracts 1 (the number of the popped element) from the removable instance number in an extended content mode of a parent element of the popped element. Thereafter, the flow returns to step S43.

At step S47, the SGML document accessing unit 30 sorts the append-reservation element list with extra element numbers. The extra element number was attached to every element in the append-reservation element list at the step S36 (its detail will be described later). The extra element numbers represent relative positions of the elements against a portion to be edited. When a particular element is placed after the portion, the sign of the extra element number thereof is positive. When the particular element is placed before the portion, the sign of the extra element number thereof is negative. For example, when the particular element is placed just before the portion, the extra element number thereof is –1. When the particular element is placed just after the portion, the extra element number thereof is 1.

At step S48, the SGML document accessing unit 30 appends an element with a negative extra element number to the top of the partial editing content model.

At step S49, the SGML document accessing unit 30 appends an element with a positive extra element number to the end of the partial editing content model.

At step S50, the SGML document accessing unit 30 makes an append-reservation of every element in the append-reservation element list.

At step S51, the SGML document accessing unit 30 checks out a portion to be edited and unlocks (cancels the select-reservations of) the designated element(s) and its parent element(s).

At step S52, the SGML document accessing unit 30 creates an element declaration of the root document element of a portion to be edited, which is composed of a partial editing document type name and a partial editing content model that represents restrictions against editing the element in the highest hierarchical level of a portion to be edited.

At step S53, the SGML document accessing unit 30 creates a partial editing DTD with the created element declaration and the declarations in the DTD of the entire document.

At step S54, the SGML document accessing unit 30 supplies the partial editing DTD and the edited data to the client 2. Thereafter, the SGML document accessing unit 30 terminates the process.

At step S55, the SGML document accessing unit 30 unlocks (cancels the select-reservations of) the designated element(s) and its parent element(s). Thereafter, the SGML document accessing unit 30 terminates the process.

Figure 17:
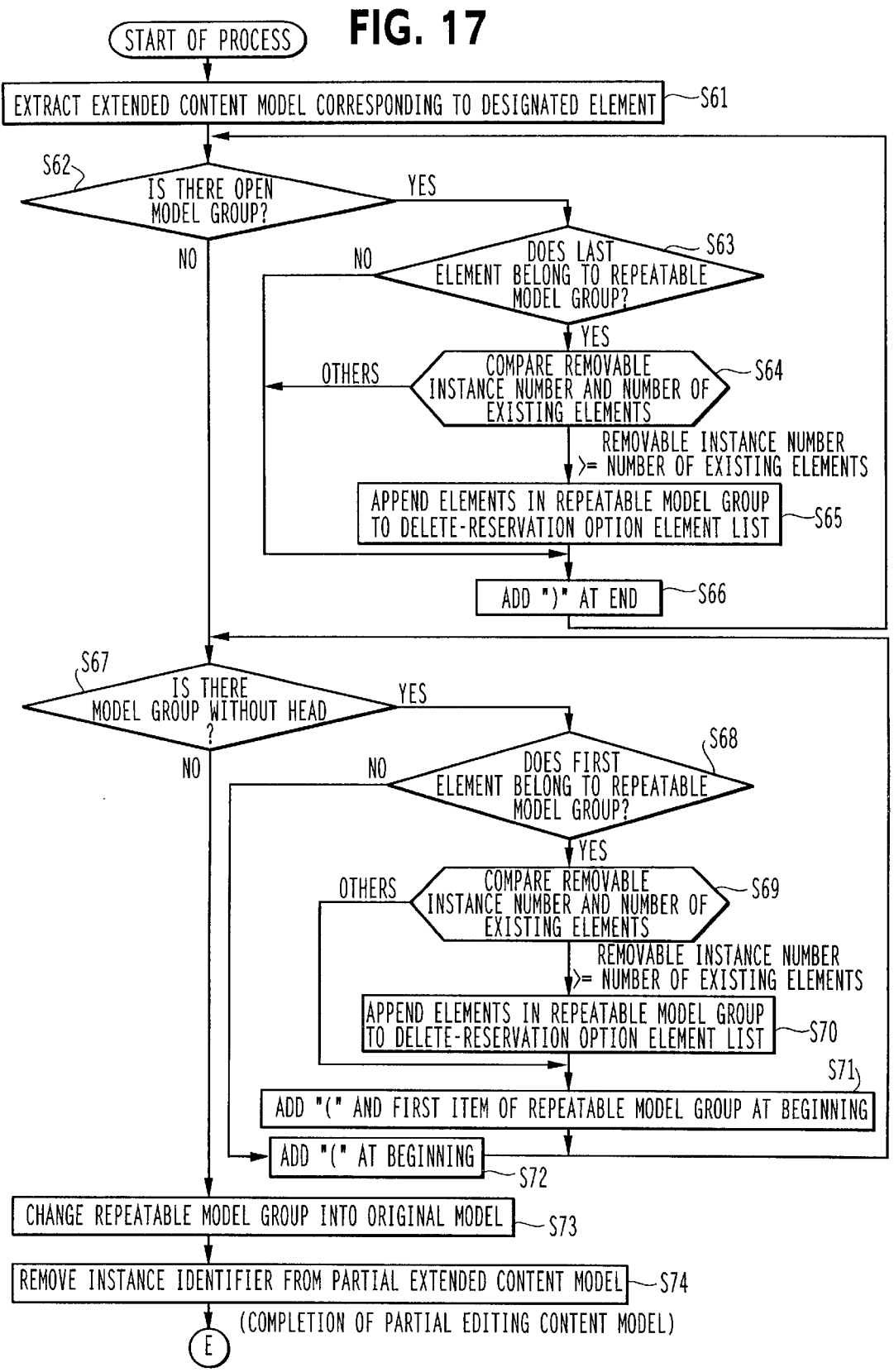
FIGS. 17 and 18 are flow charts showing a process for creating a partial editing content model using an extended content model and an append-/delete-reservation option element list.
Figure 18:
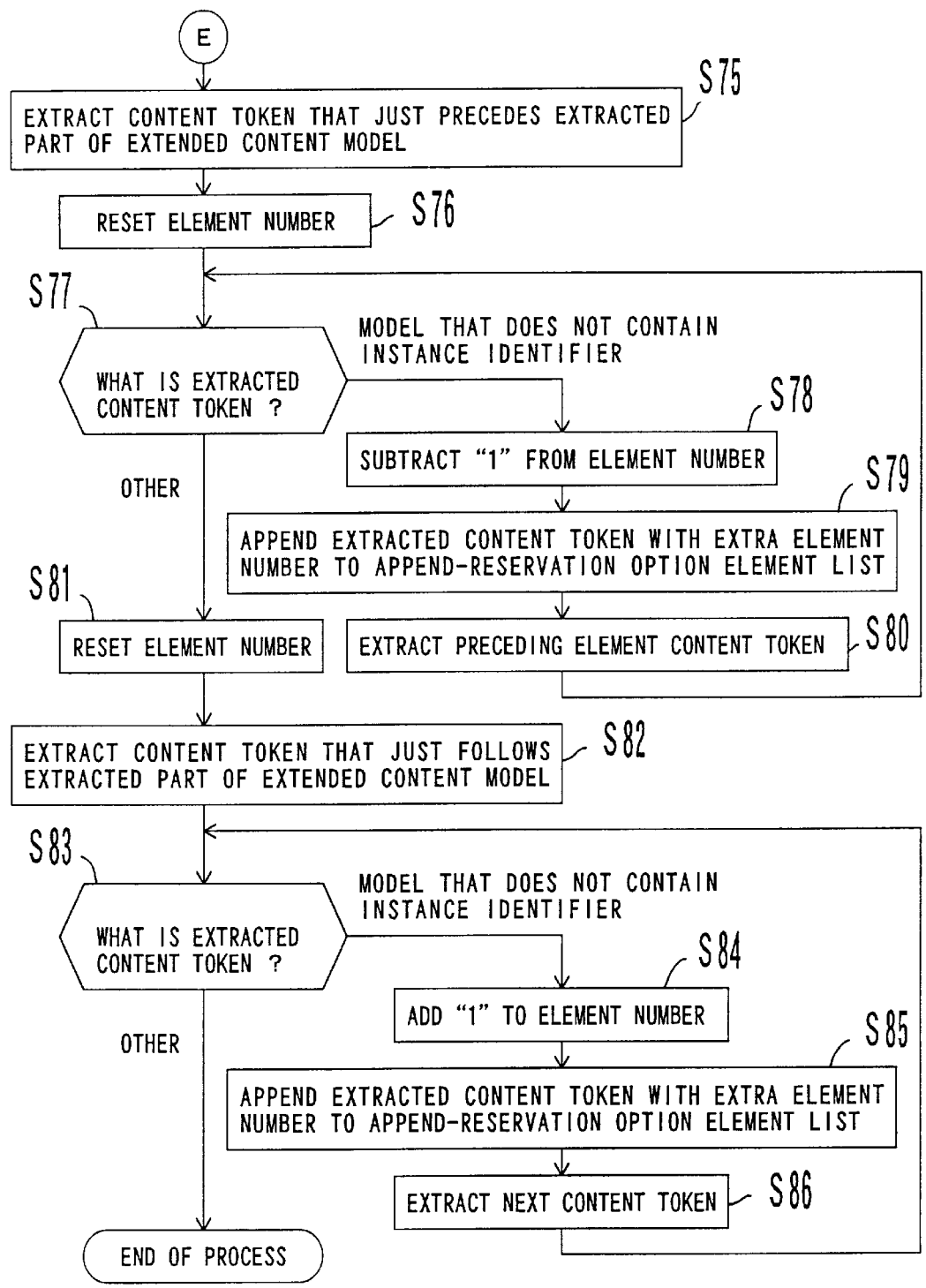

FIGS. 17 and 18 are flow charts showing a process for creating a partial editing content model using an extended content model and an append-/delete-reservation option element list at step S36 shown in FIG. 15.

At step S61 shown in FIG. 17, the SGML document accessing unit 30 extracts a part of an extended content model corresponding to the designated element(s).

At step S62, the SGML document accessing unit 30 determines whether or not a model group (an extended model group including a repeatable model group) not to be terminated (namely, an open model group) exists at the end of the part of an extended content model. When the determined result at step S62 is Yes, the flow advances to step S63. When the determined result at step S62 is No, the flow advances to step S67. This determination step is performed to deal with the case that an element is connected with OR "|" operator. Steps 63 to 66 are performed for such a purpose.

At step S63, the SGML document accessing unit 30 determines whether or not the open model group, namely the model group that the last element belongs to, is a repeatable model group. When the determined result at step S63 is Yes, the flow advances to step S64. When the determined result at step S63 is No, the flow advances to step S66.

At step S64, the SGML document accessing unit 30 compares the number of elements existing in the portion to be edited and belonging to the open repeatable model group with the removable instance number of the repeatable model group. When the removable instance number is equal to or larger than the number of the existing elements, the flow advances to step S65. Otherwise, the flow advances to step S66. At this point, if the open repeatable model group corresponds to a token with REP occurrence indicator ( "*"), the flow always advances to step S66, since a repeatable model group of this type does not need any delete-reservation. In practice, the removable instance number of a repeatable model group of this type was set to be –1 so that the determined result of step S64 always be "others".

At step S65, the SGML document accessing unit 30 appends existing elements in the open repeatable model group to the delete-reservation option element list.

At step S66, the SGML document accessing unit 30 adds extended content tokens, if they exist, following the extracted part of an extended content model with OR ('|') connectors and a ")" at the end of the part of an extracted extended content model.

At step S67, the SGML document accessing unit 30 determines whether or not a model group not to be opened (namely, a model group without a head) exists at the beginning of the part of an extended content model. When the determined result at step S67 is Yes, the flow advances to step S68. When the determined result at step S67 is No, the flow advances to step S73.

At step S68, the SGML document accessing unit 30 determines whether or not the model group without a head, namely the model group that the first element belongs to, is a repeatable model group. When the determined result at step S68 is Yes, the flow advances to step S69. When the determined result at step S68 is No, the flow advances to step S72.

At step S69, the SGML document accessing unit 30 compares the number of elements existing in the portion to be edited and belonging to the repeatable model group, namely the model group without a head, with the removable instance number of the repeatable model group. When the removable instance number is equal to or more than the number of the existing elements, the flow advances to step S70. Otherwise, the flow advances to step S71. At this point, if the repeatable model group without a head corresponds to a token with REP occurrence indicator ("*"), the flow always advances to step S71 since a repeatable model group of this type does not need any delete-reservation. In practice, the removable instance number of a repeatable model group of this type was set to be −1 so that the determined result of step S69 always be "others".

At step S70, the SGML document accessing unit 30 appends existing elements in the repeatable model group without a head to the delete-reservation option element list.

At step S71, the SGML document accessing unit 30 adds the fist item of the repeatable model group without a head, namely the removable instance number and a generic identifier/model group with a occurrence indicator, and "(" to the top of the extracted extended content model.

At step S72, the SGML document accessing unit 30 adds extended content tokens, if they exist, preceding the extracted part of an extended content model with OR ('|') connectors and a "(" at the beginning of the part of an extracted extended content model.

At step S73, the SGML document accessing unit 30 changes every repeatable model group into its original model, namely the first item of it removed the "+<removable instance number>" at the beginning.

At step S74, the SGML document accessing unit 30 removes instance identifiers from the partial extended content model. Thus, the partial editing content model is completed.

At step S75 shown in FIG. 18, the SGML document accessing unit 30 extracts a content token just precedes the extracted part of an extended content model. When the extracted part begins at the beginning of the extended content model, the SGML document accessing unit 30 can extract a content token from the extended content model in one higher hierarchical level.

At step S76, the SGML document accessing unit 30 resets the element number. The element number represents the relative position of the element as with the above-described extra element number.

At step S77, the SGML document accessing unit 30 determines what the extracted content token is. When the extracted content token is one that does not have an instance identifier, the flow advances to step S78: a content token without an instance identifier must be one with an OPT occurrence indicator ("?") or a repeatable model group, because the other types of content tokens should correspond to existing document elements in a SGML document conforming to its DTD. Otherwise, including the case where no content token is left in the hierarchical level, the flow advances to step S81.

At step S78, the SGML document accessing unit 30 subtracts 1 from the element number.

At step S79, the SGML document accessing unit 30 appends the extracted content token attached with the element number as an extra element number to the append-reservation option element list.

At step S80, the SGML document accessing unit 30 extracts the preceding content token. Thereafter, the flow returns to step S77.

At step S81, the SGML document accessing unit 30 resets the element number.

At step S82, the SGML document accessing unit 30 extracts a content token following the extracted part of an extended content model. When the extracted part ends at the end of the extended content model, the SGML document accessing unit 30 can extract a content token from the extended content model in one-level higher hierarchical level.

At step S83, the SGML document accessing unit 30 determines what the extracted content token is. When the extracted content token is one that does not have an instance identifier and that can be omitted or deleted, the flow advances to step S84. Otherwise, including the case where no content token is left in the hierarchical level, the SGML document accessing unit 30 terminates the process.

At step S84, the SGML document accessing unit 30 add 1 to the element number.

At step S85, the SGML document accessing unit 30 appends the extracted content token attached with the element number as an extra element number to the append-reservation option element list.

At step S86, the SGML document accessing unit 30 extracts the next content token. Thereafter, the flow returns to step S83.

[2] Revision history information (1) Method for storing revision history

The extended content model as shown in FIG. 7 represents the arrangement of all elements in an immediate lower hierarchical level of a particular document element. Thus, the history of changes of the extended content model attached to a document element can be used to track the changes of the part of a document structure under the document element. With reference to the revision histories of both the extended content models of all document elements and the immediate upper document elements, namely parent elements, of all document elements, changes of the entire structure of the document can be completely tracked.

In other words, the changes of element arrangement in immediate lower hierarchical levels of an element can be tracked with reference to a revision history of an extended content model. With reference to a revision history of an extended content model of a former parent element of a document element, where the document element was previously located at the former time can be tracked, even if the document element has been moved from under another parent element to the current one.

Thus, according to the present invention, a history information is stored and managed in the following manner. As shown in FIGS. 4A and 4B, the history information is composed of two kinds of information: one managed for each document and one managed for each document element. The history information managed for each document includes system assigned information and user assigned information. Examples of the system assigned information are a revision date and time, a reviser, and a revised portion. Examples of the user assigned information are a revision name and a comment. The history information managed for each document is assigned a unique revision number in the order of all revisions through the life cycle of the document. The history information managed for each document is master data. To improve the access efficiency of revision history for each element, a copy of the master data can be distributed to document elements and stored as their history information.

The history information managed for each document element is composed of a revision history of a parent element, a revision history of an extended content model, a revision history of document contents, a revision history of tags and attributes, and a comment. These information items are normally stored as links between document elements of different revisions. Each of the links relates a particular revision document element with its corresponding document element of the previous revision, attached with a revision number, a comment, and information of a child document element that has been deleted, imported, or exported.

History information of document elements that are not used in any document of the recent revision and will no longer be used again in any document of the future revision may be stored as difference data, so as to improve the space efficiency and the access efficiency of the revision history. When the history information is stored as difference data, difference data of a document element contains a revision number, a comment, an identifier of a parent element at the revision, an extended content model, document contents that have not been revised, tags, and attributes, as a sequence.

(2) Method for creating a revision history of a document structure

When the SGML document accessing unit 30 checks in a document, it creates a revision history of the structure thereof by comparing extended content models of the new revision and the original revision. To accurately calculate the difference of content models, the SGML document accessing unit 30 supplies clue information that helps the calculation for tracing the changes in arrangements of document elements with SGML attributes of document elements to the SGML document editing unit 10. This information attached to a document element comprises two sets of identifiers corresponding to a document element and its parent element, each of which is composed of a document identifier and an element identifier, and a revision number. Among them, the document identifier and the revision number are used for sharing and exchanging a document element with another document or a document of another revision. When a document is normally edited, only the element identifier is used.

The operations of the SGML document editing unit 10 are categorized as changes in the structure of document elements (such as move, exchange, append, and delete operations), changes of data of document elements, and changes of attributes of document elements. When the structure is changed, the SGML document editing unit 10 appends an identifier of a child document element being deleted, exported or imported to a parent element as SGML attributes with reference to an editing operation. When an element is appended or copied, a temporary element identifier for the element being appended or copied is assigned.

The SGML document editing unit 10 can import an element (or a partial tree) of another document as a part of a particular document. In this case, an instance identifier of an imported element (or the root element of an imported partial tree) stored in an extended content model is composed of a set of a document identifier and an element identifier. In addition, a default value of a change mode of the imported element is also assigned. The change mode is used to determine whether a change to an imported element affects the original element. The change mode is categorized as a share mode, an independent mode, and a link mode. In the share mode, the original element is changed. In the independent mode, the original element is not changed. In the link mode, no change is permitted. In the share mode, a portion of another document corresponding to an element that has been checked out is also checked out.

When document portions that have been independently checked out are exchanged, regardless of whether they are portions of the same document, the SGML document editing unit 10 forcedly enters a synchronous check-in mode. In this case, the SGML document accessing unit 30 accepts a check-in request as long as the edited results of both the document portions are correct. It is also possible to create a revision history of a document structure after editing with a conventional SGML editor in place of the SGML document editing unit 10, unless the above-described attributes assigned by the SGML document accessing unit 30 are changed. However, in this case, document elements of another document cannot be imported. In addition, the link mode and the share mode are not available. Moreover, the SGML document accessing unit 30 might not recognize copy operations properly under some conditions.

(3) Example of creating revision history

Figure 19:
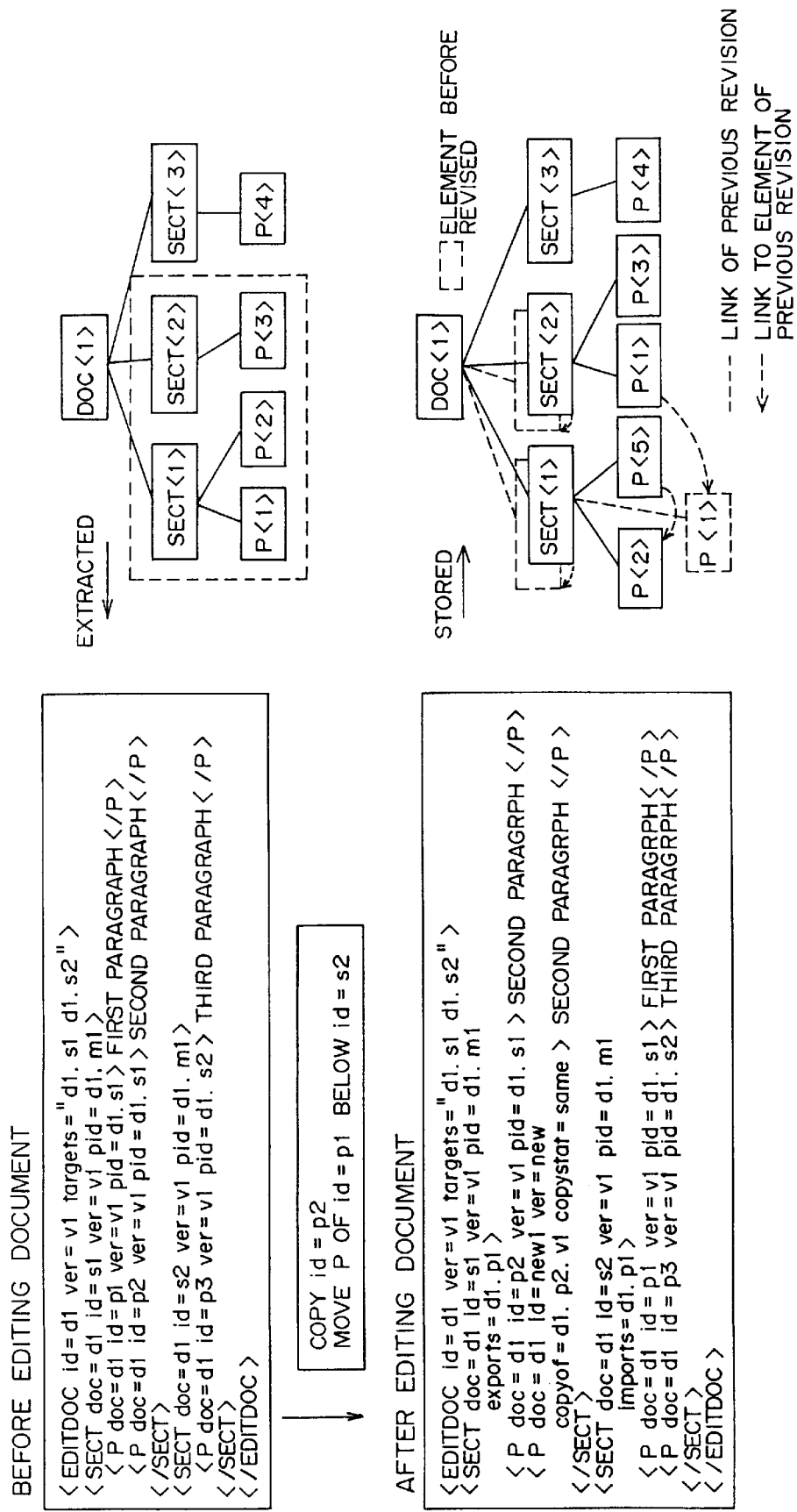
FIG. 19 is a flow chart for explaining an example of creating a revision history.

FIG. 19 is a schematic diagram for explaining an example of creating a revision history. The SGML document accessing unit 30 extracts a portion surrounded by dotted lines from an SGML document main body (the upper right portion shown in FIG. 19). It encodes a document identifier (doc), an element identifier (id), a revision number (ver), and an identifier of a parent element (pid) to SGML attributes of each document element for the SGML document editing unit 10 to edit the extracted portion (see the upper left portion of FIG. 19).

In this example, the SGML document editing unit 10 copies the element with the element identifier p2 (the second P) and moves the element with the element identifier p1 (the first P) from under the element with element identifier s1 (the first SECT) to under the element with the element identifier s2 (the second SECT).

The SGML document editing unit 10 assigns a temporary element identifier (new1) to the copy element of the p2 element, and sets an attribute copyof, which specifies the original element, and an attribute copystat, which represents a change mode (in this example, an independent mode), of the copy element (see the lower left portion of FIG. 19). The attribute "copyof=d1.p1.v1" of the second P (id=new1) in the resultant document represents that the second P is a copy of the first P of the original document (ver=v1). The SGML document editing unit 10 also records the movement of the first P (id=p1). It assigns the instance identifier corresponding to the P ("d1.p1") to an attribute "exports" of the first SECT (id=s1) and an attribute "imports" of the second SECT (id=s2). The attribute "exports=d1.p1" of the first SECT represents that the first paragraph (id=p1) is located under the first SECT in the original document. The attribute "imports=d1.p1" of the second SECT (id=s2) represents that the first paragraph (id=p1) of the original document is located under the second SECT in the resultant document.

The SGML document accessing unit 30 receives the edited results, and stores them in the database as shown in the lower right portion shown in FIG. 19. New elements (SECT<1>, SECT<2>, and P<1>) are created for the updated portion, and each of these is linked to its corresponding element in the previous revision.

(4) Method for outputting a revision history

According to the present invention, a revision history can be output along with an SGML document. In addition, a revision history is output in the SGML document type. The revision history normally comprises a list of difference data of revisions. It can also be represented as transitional relations between an original document and a revised document when an original document as well as a revised document is completely output.

There are two types of output formats of a revision history. The first type uses a DTD of an SGML document with a revision history, which is composed of declarations of history information and of the original DTD. The second type outputs history information in a hub document that includes an original SGML document as a subdocument. The second type is categorized as two subtypes. The first subtype outputs a revision history in the form of a list of difference data and relates them with their corresponding elements of an SGML document of a recent (or particular) revision. The other subtype outputs a sequence of SGML documents of different revisions and the transitional relations among them. In any type, the contents of history information are the same as those shown in FIG. 4.

In an SGML document with a revision history, history information and revised document elements are correlated with an ID referencing function of the SGML. Thus, an attribute corresponding to an instance identifier is embedded in each document element of the SGML document main body. With a location ladder function specified by HyTime (Hypermedia Time-based structuring language: ISO 10744), such an operation can be performed without modifying the DTD of an original SGML document. This is because the structure of an instance identifier used by the present invention has an affinity to the ID reference of the SGML and the link function HyTime.

An element identifier of the present invention can be used as an ID attribute of a document element of an SGML document main body. A document identifier can be used as an identifier of an SGML document main body in the case that the SGML document main body is output as an external entity inserted in a hub document representing a revision history. A revision number can be used as an ID attribute of an element that contains history information of a revision.

(5) Outputting an SGML document with history information

FIGS. 20 and 21 are schematic diagrams showing an example of the DTD of an SGML document with a revision history in the case that the instance identifiers of the present invention, such as an element identifier, are embedded in the SGML attributes of document elements. The element identifier and revision number corresponding to an element imported from another document are prefixed a document identifier of the imported document, and used as an ID attribute of either a document element (in the part of ESDdoc of FIG. 21) or a revision history element ("change" element in FIG. 20), respectively.

When an element identifier is not embedded in an SGML document main body, the DTD of the history information is the same as that described above, except that the element identifiers are not directly correlated with the corresponding elements of an SGML document main body. They are correlated with their corresponding elements indirectly using the location ladder mechanism of HyTime. For example, the element identifiers of the present invention can be correlated with their related elements using the pathloc option of HyTime, where the original document is defined as an external entity, and every one of its elements is identified by its locus in a tree structure of the document elements.

Figure 22:
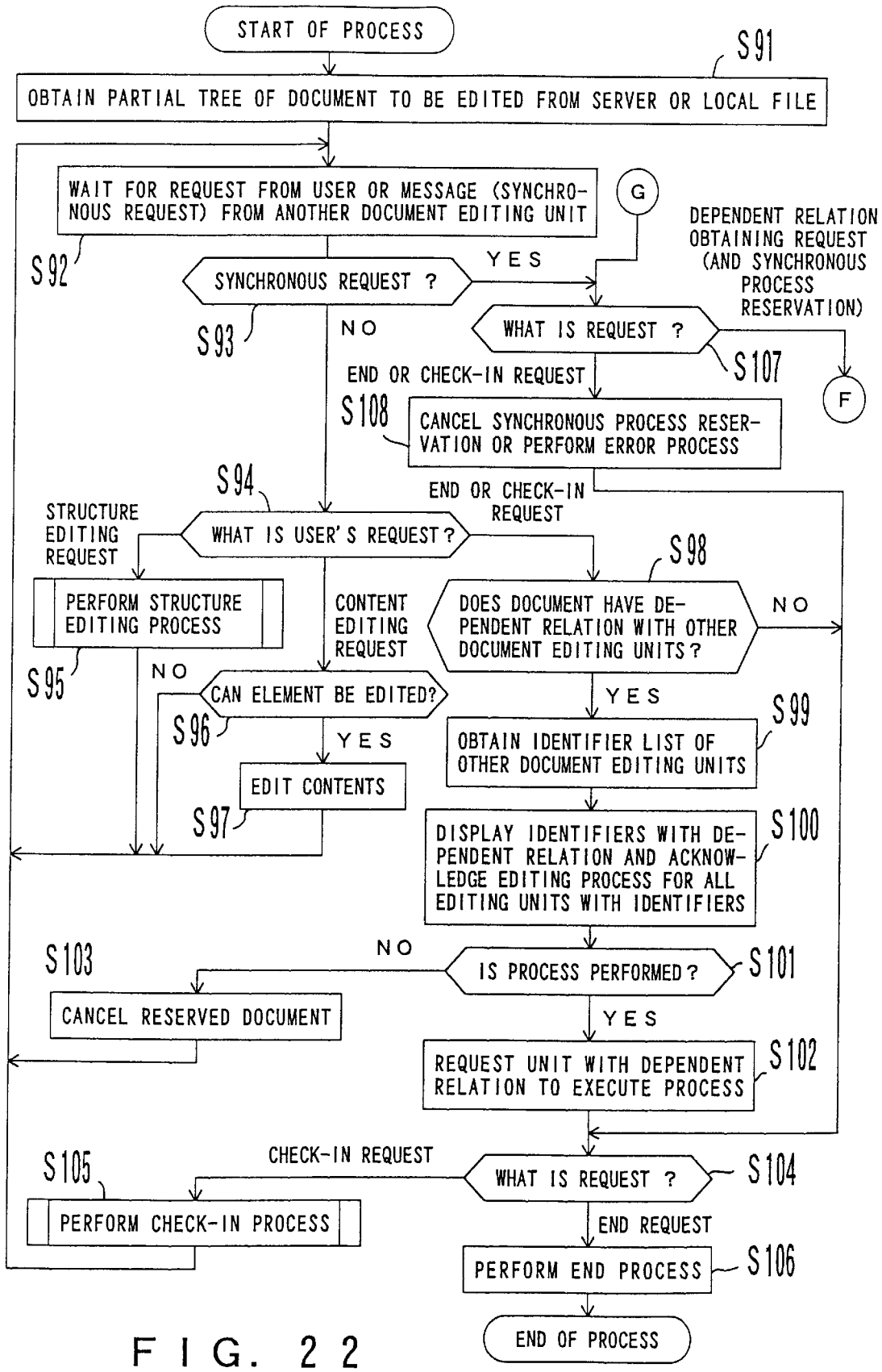
FIGS. 22 and 23 are flow charts showing a process for editing a document.
Figure 23:
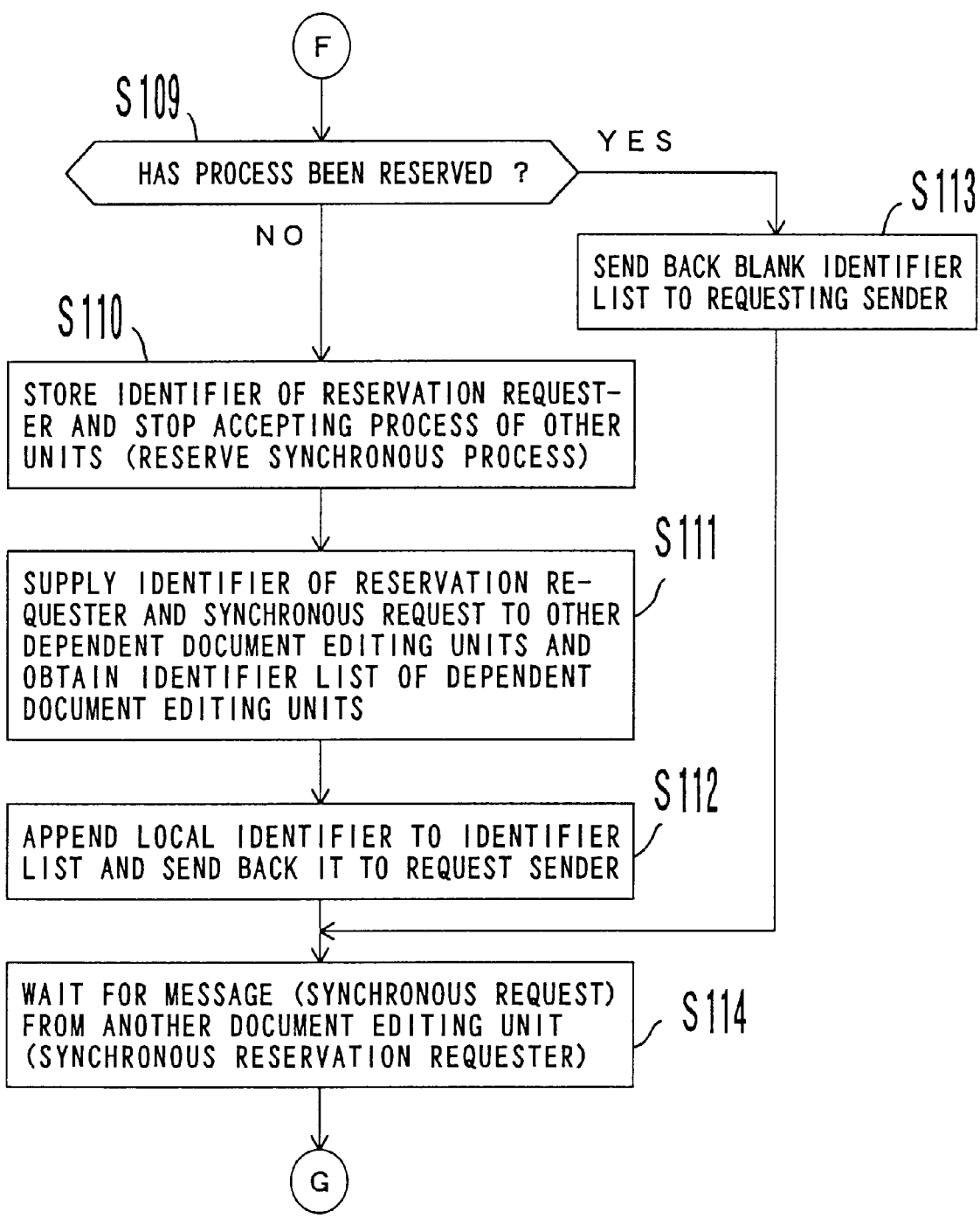

FIGS. 22 to 29 are flowcharts showing a document editing process of the SGML document editing unit 10. FIGS. 22 and 23 show the entire flow of the entire document editing process.

At step S91 shown in FIG. 22, the SGML document editing unit 10 obtains a partial tree of a document to be edited from the server 3 using the SGML document accessing unit 30 or local files (a control file and a plurality of document files) storing results of editing that has been suspended. At this point, if the local files contains two or more portions to be edited, or two or more portions have been extracted by the SGML document accessing unit 30, i.e., in the case that a user want to edit those document parts that relate with each other together (in a synchronous check-in mode), one or more extra document editing units will be started, attached with the dependent relations against editing by other document editing units with reference to the relations among their editing portions.

At step S92, the SGML document editing unit 10 waits for one of the following messages from the user or another document unit: a request from the user or a synchronous request from another document editing unit.

At step S93, the SGML document editing unit 10 determines whether or not the message that has been received is a synchronous request. When the determined result at step S93 is Yes, the flow advances to step S107. When the determined result at step S93 is No, the flow advances to step S94.

At step S94, the SGML document editing unit 10 determines what request the user has issued. When the user has issued a document structure editing request, the flow advances to step S95. When the user has issued a document content editing request, the flow advances to step S96. When the user has issued an end request or a check-in request, the flow advances to step S98.

At step S95, the SGML document editing unit 10 performs a structure editing process (that will be described later).

At step S96, the SGML document editing unit 10 determines whether or not the obtained element can be edited. When the determined result at step S96 is Yes, the flow advances to step S97. When the determined result at step S96 is No, the flow returns to step S92.

At step S97, the SGML document editing unit 10 edits the contents of the document.

At step S98, the SGML document editing unit 10 determines whether or not the document has a dependent relation with other document editing units. When the determined result at step S98 is Yes, the flow advances to step S99. When the determined result at step S98 is No, the flow advances to step S104.

At step S99, the SGML document editing unit 10 sends a dependent relation obtaining request to other SGML document editing units that are editing the document portions directly related with its editing portion, and obtains an identifier list of SGML document editing units that depend on each other directly or indirectly with reference to their editing portions, and removes redundant identifiers from the identifier list.

At step S100, the SGML document editing unit 10 displays all the identifiers of SGML document editing units that depend on each other with reference to their editing portion and acknowledges that the SGML document editing unit 10 performs the editing process for all the editing units with the identifiers.

At step S101, the SGML document editing unit 10 determines whether or not to perform the process acknowledged at step S100. When the determined result at step S101 is Yes, the flow advances to step S102. When the determined result at step S101 is No, the flow advances to step S103.

At step S102, the SGML document editing unit 10 requests the other SGML document editing units to execute their processes corresponding to the process that the SGML document editing unit 10 has performed. Thereafter, the flow advances to step S104.

At step S103, the SGML document editing unit 10 cancels the reserved document. Thereafter, the flow returns to step S92.

At step S104, the SGML document editing unit 10 determines what the request was. When the request was the check-in request, the flow advances to step S105. When the request was the process end request, the flow advances to step S106.

At step S105, the SGML document editing unit 10 performs a check-in process (that will be described later). Thereafter, the flow returns to step S92.

At step S106, the SGML document editing unit 10 performs the end process (that will be described later).

At step S107, the SGML document editing unit 10 determines what the synchronous request was. When the synchronous request was an end request or a check-in request, the flow advances to step S108. When the synchronous request was a dependent relation obtaining request (and a synchronous process reservation), the flow advances to step S109 (see FIG. 23).

At step S108, the SGML document editing unit 10 cancels the synchronous process reservation or performs an error process. Thereafter, the flow advances to step S104.

At step S109 shown in FIG. 23, the SGML document editing unit 10 determines whether or not a process has been reserved. When the determined result at step S109 is Yes, the flow advances to step S113. When the determined result at step S109 is No, the flow advances to step S110.

At step S110, the SGML document editing unit 10 stores an identifier of the reservation requester so as to reserve the synchronous process and stops accepting processes from the other units.

At step S111, the SGML document editing unit 10 passes the identifier of the reservation requester and the synchronous request to the other document editing units that are editing the document portions directly related with its editing portion, and obtains an identifier list of the document editing units with the dependent relation to it.

At step S112, the SGML document editing unit 10 appends the local identifier to the identifier list and sends back the resultant identifier list to the request sender.

At step S113, which is the case that the requested unit has already received a synchronous process reservation request, the SGML document editing unit 10 sends back a blank document editing unit identifier list to the request sender. When the identifier is different from the reserved identifier, the SGML document editing unit 10 informs the request sender that the synchronous process reservation has failed so that the request sender will perform an error process.

At step S114, the SGML document editing unit 10 waits for a message (synchronous request) from the document editing unit that has originally sent the synchronous request (a synchronous reservation requester). Thereafter, the flow returns to step S107.

Figure 24:
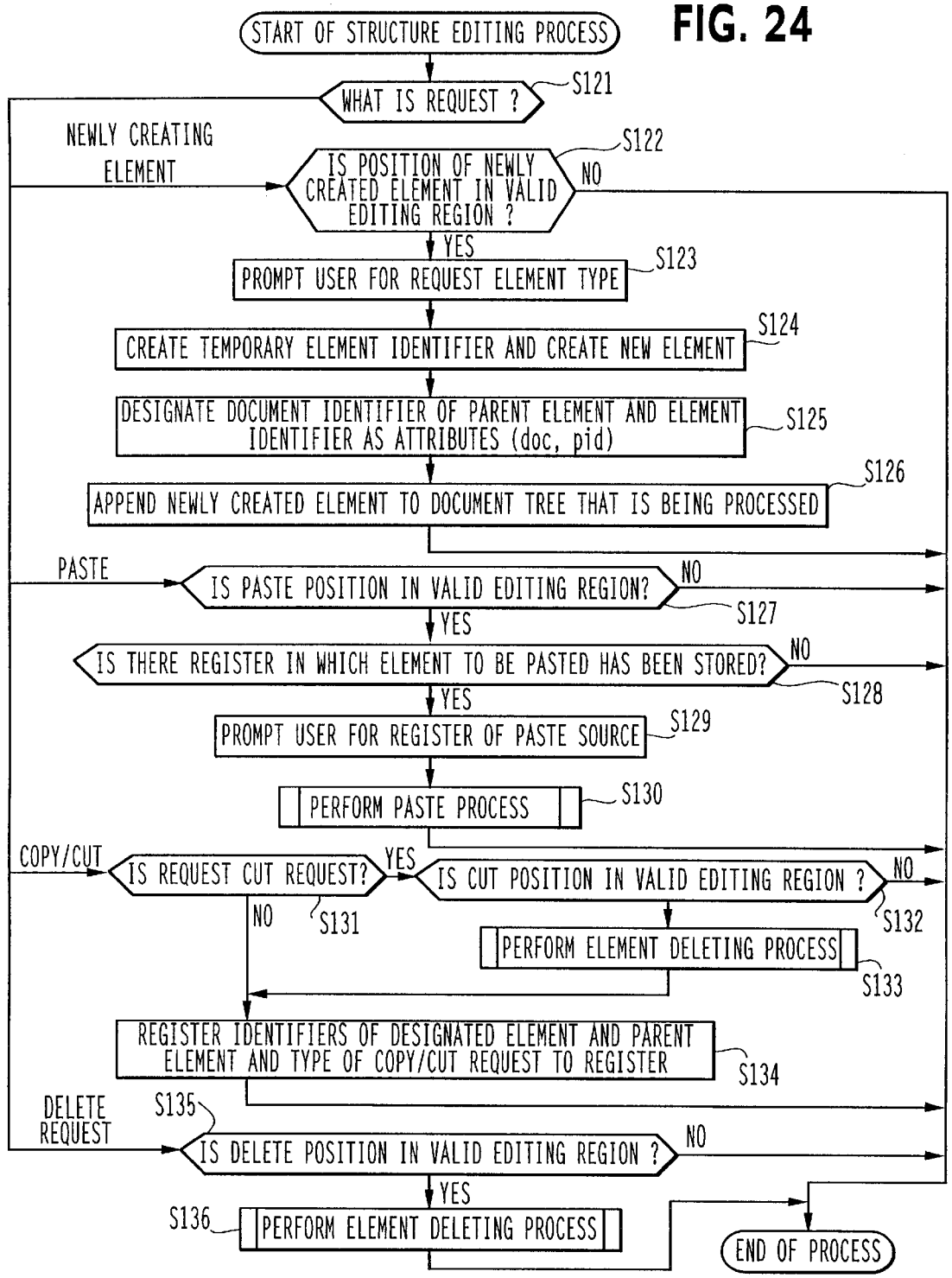
FIG. 24 is a flow chart showing a structure editing process.

FIGS. 24 is a flowchart showing the structure editing process at step S95 shown in FIG. 22.

At step S121, the SGML document editing unit 10 determines what the user has requested. When the request was a new create request, the flow advances to step S122. When the request was a paste request, the flow advances to step S127. When the request was a copy/cut request, the flow advances to step S131. When the request was a delete request, the flow advances to step S135.

At step S122, the SGML document editing unit 10 determines whether the position of an element to be newly created is in a valid editing region. When the determined result at step S122 is Yes, the flow advances to step S123. When the determined result at step S122 is No, the SGML document editing unit 10 completes the process.

At step S123, the SGML document editing unit 10 prompts the user for the type of the element to be newly created.

At step S124, the SGML document editing unit 10 creates a temporary element identifier of an element to be newly created and creates a new element.

At step S125, the SGML document editing unit 10 designates a document identifier and an element identifier of the parent element to be newly created as attributes (doc, pid).

At step S126, the SGML document editing unit 10 appends the newly created element to the document tree that is being processed. Thereafter, the SGML document editing unit 10 completes the process.

At step S127, the SGML document editing unit 10 determines whether or not the paste position is in the valid editing region. When the determined result at step S127 is Yes, the flow advances to step S128. When the determined result at step S127 is No, the SGML document editing unit 10 completes the process.

At step S128, the SGML document editing unit 10 determines whether or not there is a register in which an element to be pasted has been stored. When the determined result at step S128 is Yes, the flow advances to step S129. When the determined result at step S128 is No, the SGML document editing unit 10 completes the process.

At step S129, the SGML document editing unit 10 prompts the user to select a register of the paste source.

At step S130, the SGML document editing unit 10 performs a paste process (that will be described later) and completes the process.

At step S131, the SGML document editing unit 10 determines whether the request is a cut request or a copy request. When the request is a cut request, the flow advances to step S132. When the request is a copy request, the flow advances to step S134.

At step S132, the SGML document editing unit 10 determines whether or not the cut position is in the valid editing region. When the determined result at step S132 is Yes, the flow advances to step S133. When the determined result at step S132 is No, the SGML document editing unit 10 completes the process.

At step S133, the SGML document editing unit 10 performs an element deleting process (that will be described later). In other words, the SGML document editing unit 10 appends the designated element to a delete list and updates deleted element information of a parent element of the designated element.

At step S134, the SGML document editing unit 10 stores identifiers of the designated element and the parent element and the type of copy/cut request to a register and then completes the process.

At step S135, the SGML document editing unit 10 determines whether or not the deleted portion is in the valid editing region. When the determined result at step S135 is Yes, the flow advances to step S136. When the determined result at step S135 is No, the SGML document editing unit 10 completes the process.

At step S136, the SGML document editing unit 10 performs an element deleting process (that will be described later), and then completes the process.

Figure 25:
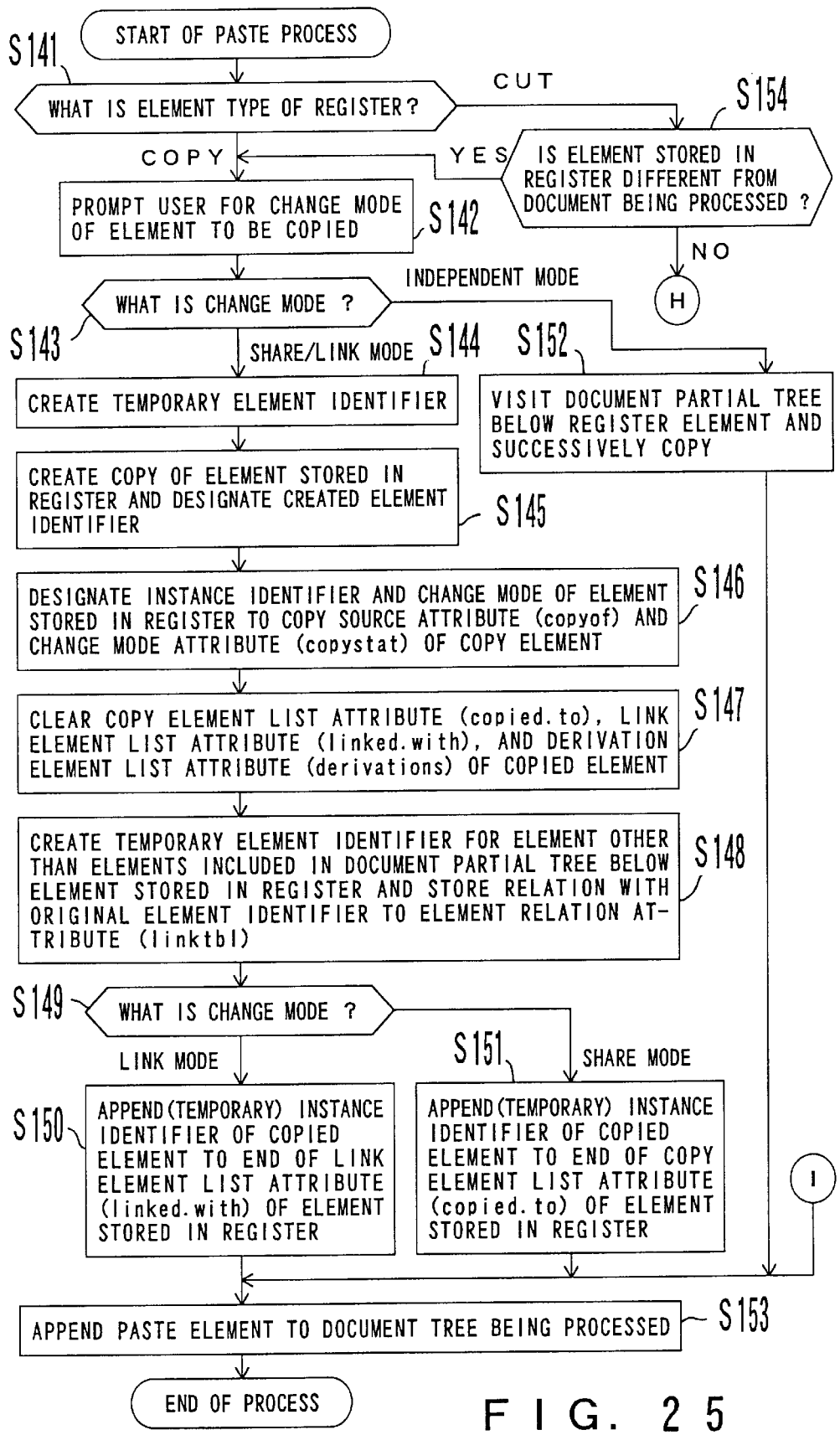
FIGS. 25 and 26 are flow charts showing a pasting process.
Figure 26:
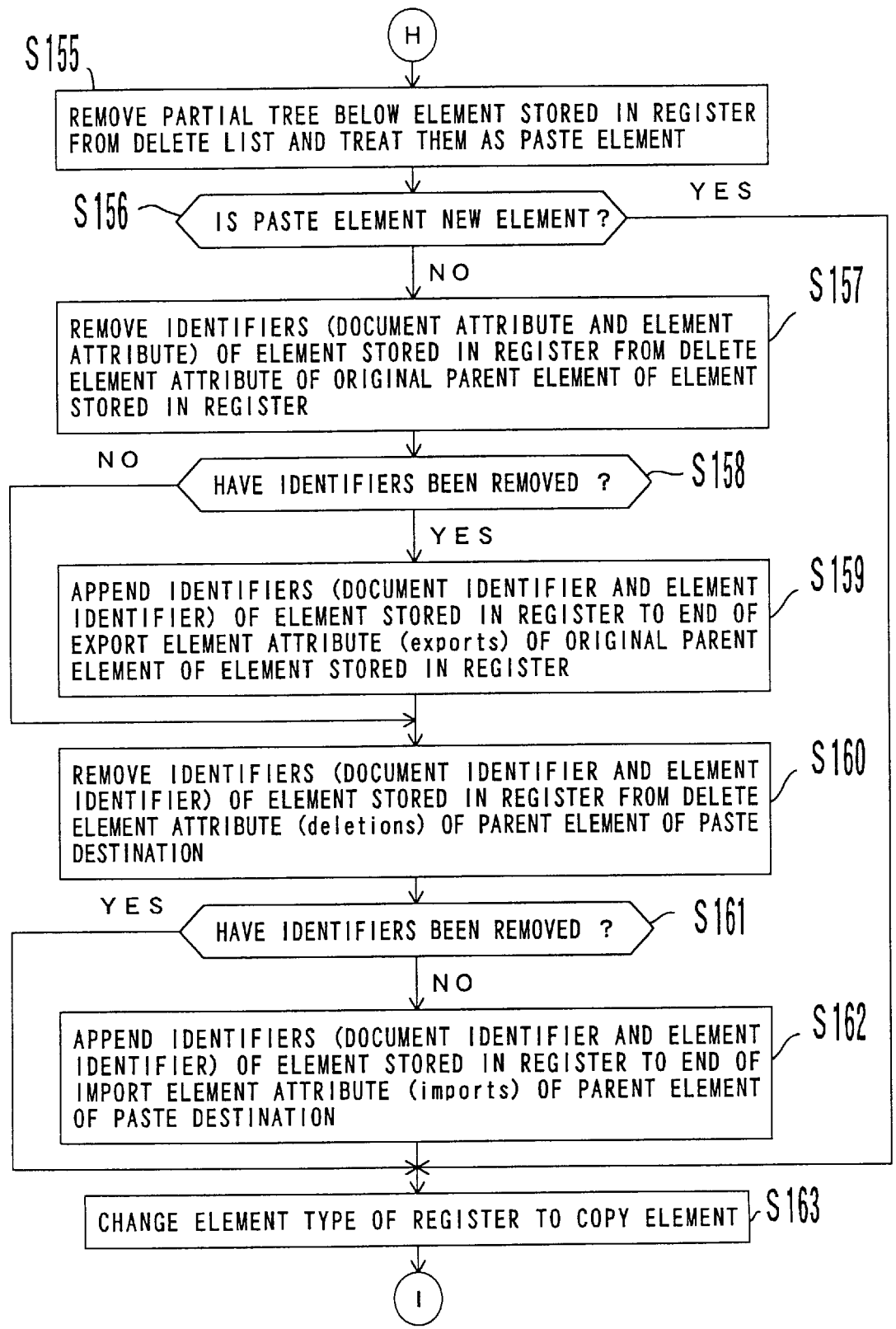

FIGS. 25 and 26 are flowcharts showing the paste process at step S130 shown in FIG. 24.

At step S141 shown in FIG. 25, the SGML document editing unit 10 determines the type of an element to be stored in the register. When the type is copy, the flow advances to step S142. When the type is cut, the flow advances to step S154.

At step S142, the SGML document editing unit 10 prompts the user to select a change mode of the element to be copied.

At step S143, the SGML document editing unit 10 determines whether the change mode is a share mode, a link mode, or an independent mode. When the change mode is the share mode or the link mode, the flow advances to step S144. When the change mode is the independent mode, the flow advances to step S152.

At step S144, the SGML document editing unit 10 creates a temporary element identifier.

At step S145, the SGML document editing unit 10 creates a copy of the element stored in the register and designates the identifier of the created element to the copied element.

At step S146, the SGML document editing unit 10 designates the instance identifier and the change mode of the element stored in the register to the copy source attribute (copyof) and change mode attribute (copystat), respectively.

At step S147, the SGML document editing unit 10 clears a copy element list attribute (copied.to), a link element list attribute (linked.with), and a derivation list attribute (derivations) of the copied element.

At step S148, the SGML document editing unit 10 creates a temporary element identifier for every element other than elements included in the document partial tree and stores the relation between the original element identifier and the created element identifier to an element relation attribute (linktbl).

At step S149, the SGML document editing unit 10 determines whether the change mode is a link mode or a share mode. When the change mode is the link mode, the flow advances to step S150. When the change mode is the share mode, the flow advances to step S151.

At step S150, the SGML document editing unit 10 appends the (temporary) instance identifier of the copied element to the end of the link element list attribute (linked.with) of the element stored in the register. Thereafter, the flow advances to step S153.

At step S151, the SGML document editing unit 10 appends the (temporary) instance identifier of the copied element to the end of the copy element list attribute (copied.to) of the register element. Thereafter, the flow advances to step S153.

At step S152, the SGML document editing unit 10 successively copies document elements below the element stored in the register. In other words, the SGML document editing unit 10 creates a temporary identifier, substitutes an element identifier with the created temporary identifier, designates an instance identifier of an original element as a copy source attribute, and assigns the independent mode as the change mode. The SGML document editing unit 10 appends the instance identifier of the copy element to the derivation element list attribute (derivations) of the element of the copy source. The SGML document editing unit 10 changes the share/link relation closed in the partial tree to the link relation in the partial tree.

At step S153, the SGML document editing unit 10 appends the paste element to the partial tree that is being processed. Thereafter, the SGML document editing unit 10 completes the process.

At step S154, the SGML document editing unit 10 determines whether or not the element in the register is different from the document that is being processed. When the determined result at step S154 is Yes, the flow advances to step S142. When the determined result at step S154 is No, the flow advances to step S155 (see FIG. 26).

At step S155 shown in FIG. 26, the SGML document editing unit 10 removes a partial tree below the element stored in the register from the delete list and treats them as paste elements.

At step S156, the SGML document editing unit 10 determines whether or not the paste element is a new element. When the determined result at step S156 is Yes, the flow advances to step S163. When the determined result at step S156 is No, the flow advances to step S157.

At step S157, the SGML document editing unit 10 removes identifiers (a document identifier and an element identifier) of the element stored in the register from the deleted element attribute (deletions) of the original parent element of the element stored in the register.

At step S158, the SGML document editing unit 10 determines whether or not the identifiers of the element stored in the register have been removed. When the determined result at step S158 is Yes, the flow advances to step S159. When the determined result at step S158 is No, the flow advances to step S160.

At step S159, the SGML document editing unit 10 appends the identifiers (the document identifier and the element identifier) of the register element at the end of the exported element attribute (exports) of the original parent element of the element stored in the register.

At step S160, the SGML document editing unit 10 removes the identifiers (the document identifier and the element identifier) of the element stored in the register from the deleted element attribute (deletions) of the parent element of the paste destination.

At step S161, the SGML document editing unit 10 determines whether or not the identifiers of the register element have been removed. When the determined result at step S161 is Yes, the flow advances to step S163. When the determined result at step S161 is No, the flow advances to step S162.

At step S162, the SGML document editing unit 10 appends the identifiers (the document identifier and the element identifier) of the element stored in the register at the end of the imported element attribute (imports) of the parent element of the paste destination.

At step S163, the SGML document editing unit 10 changes the element type of the register to the copy element. Thereafter, the flow returns to step S153.

Figure 27:
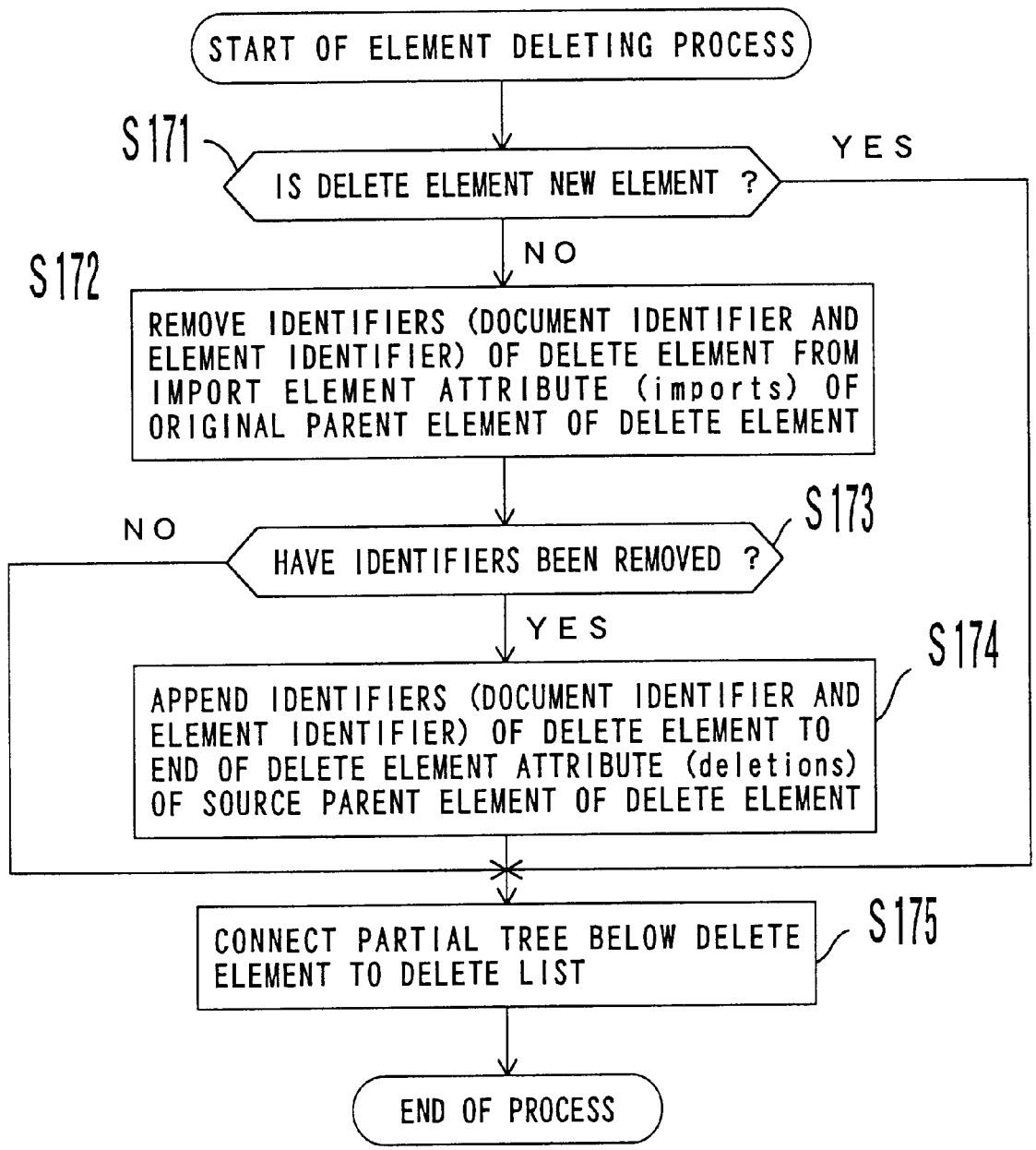
FIG. 27 is a flow chart showing an element deleting process.

FIG. 27 is a flow chart showing the element deleting process at steps S133 and S136 shown in FIG. 24.

At step S171, the SGML document editing unit 10 determines whether or not an element to be deleted is a new element. When the determined result at step S171 is Yes, the flow advances to step S175. When the determined result at step S171 is No, the flow advances to step S172.

At step S172, the SGML document editing unit 10 removes the identifiers (the document identifier and the element identifier) of the delete element from the imported element attribute (imports) of the original parent element of the delete element.

At step S173, the SGML document editing unit 10 determines whether or not the identifiers of the delete element have been removed. When the determined result at step S173 is Yes, the flow advances to step S174. When the determined result at step S173 is No, the flow advances to step S175.

At step S174, the SGML document editing unit 10 appends the identifiers (the document identifier and the element identifier) of the delete element to the end of the deleted element attribute (deletions) of the source parent element of the delete element.

At step S175, the SGML document editing unit 10 connects the document partial tree below the delete element to the delete list and completes the process.

Figure 28:
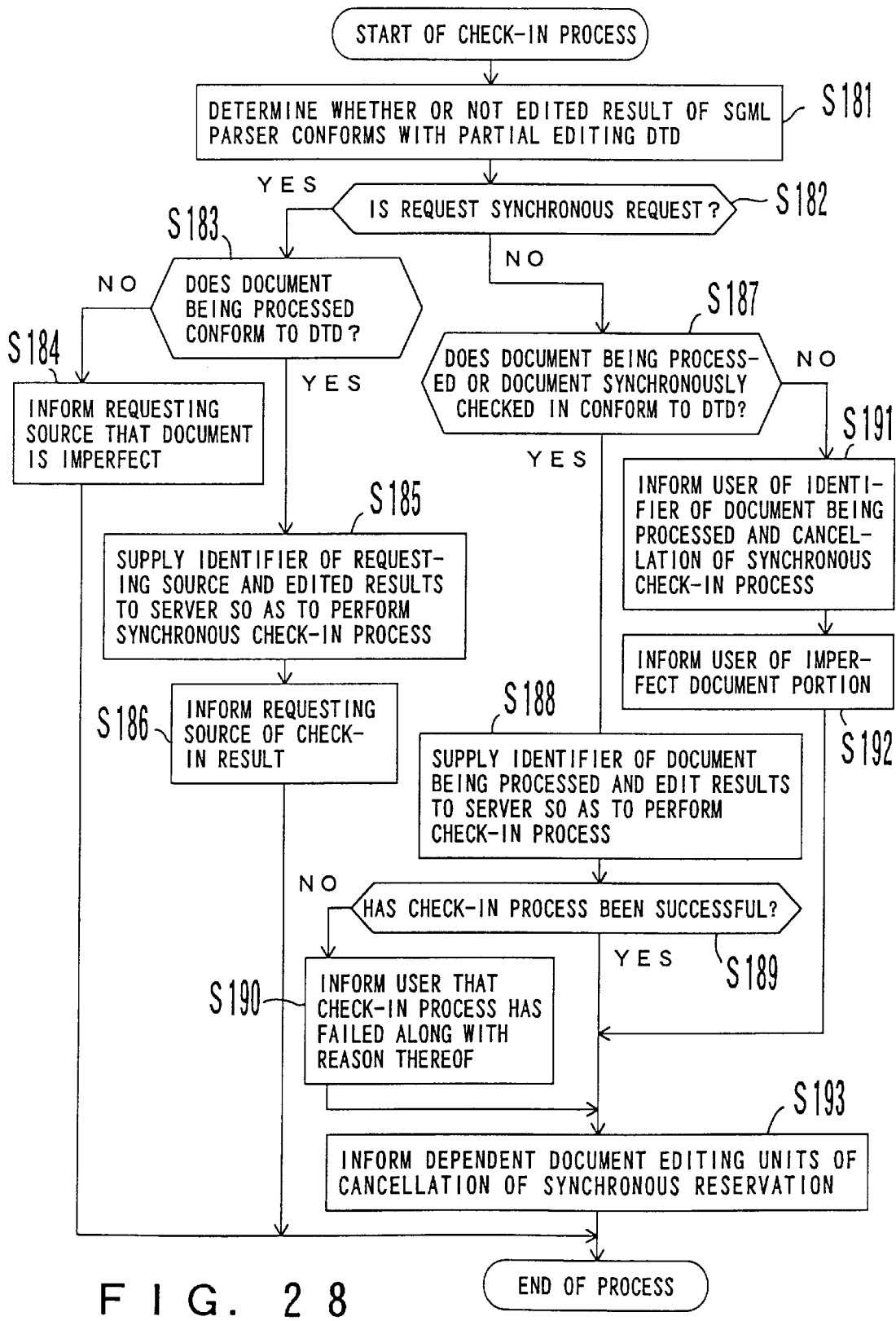
FIG. 28 is a flow chart showing a check-in process.

FIG. 28 is a flow chart showing the check-in process at step S105 shown in FIG. 22.

At step S181, the SGML document editing unit 10 determines whether or not the edited result of the SGML parser conforms to the partial editing DTD.

At step S182, the SGML document editing unit 10 determines whether or not the request is a synchronous request. When the determined result at step S182 is Yes, the flow advances to step S183. When the determined result at step S182 is No, the flow advances to step S187.

At step S183, the SGML document editing unit 10 determines whether or not the document being processed conforms to the DTD. When the determined result at step S183 is No, the flow advances to step S184. When the determined result at step S183 is Yes, the flow advances to step S185.

At step S184, the SGML document editing unit 10 informs the requesting source that the document is imperfect and then completes the process.

At step S185, the SGML document editing unit 10 supplies the identifier of the requesting source and the edited results to the server and performs the (synchronous) check-in process.

At step S186, the SGML document editing unit 10 informs the requesting source of the check-in results and then completes the process.

At step S187, the SGML document editing unit 10 determines whether or not the document being processed or the document that is synchronously checked in conforms to the DTD. When the determined result at step S187 is Yes, the flow advances to step S188. When the determined result at step S187 is No, the flow advances to step S191.

At step S188, the SGML document editing unit 10 supplies the identifier of the document being processed and the edited results to the server and performs the check-in process.

At step S189, the SGML document editing unit 10 determines whether or not the check-in process has been successfully performed. When the determined result at step S189 is Yes, the flow advances to step S193. When the determined result at step S190 is No, the flow advances to step S190.

At step S190, the SGML document editing unit 10 informs the user that the check-in process has failed along with the reason thereof. Thereafter, the flow advances to step S193.

At step S191, the SGML document editing unit 10 informs the user of the document identifier and the cancellation of the synchronous check-in process.

At step S192, the SGML document editing unit 10 outputs the imperfect document portion to the user.

At step S193, the SGML document editing unit 10 informs all document editing units with a dependent relation of the cancellation of the synchronous process reservation and then completes the process.

Figure 29:
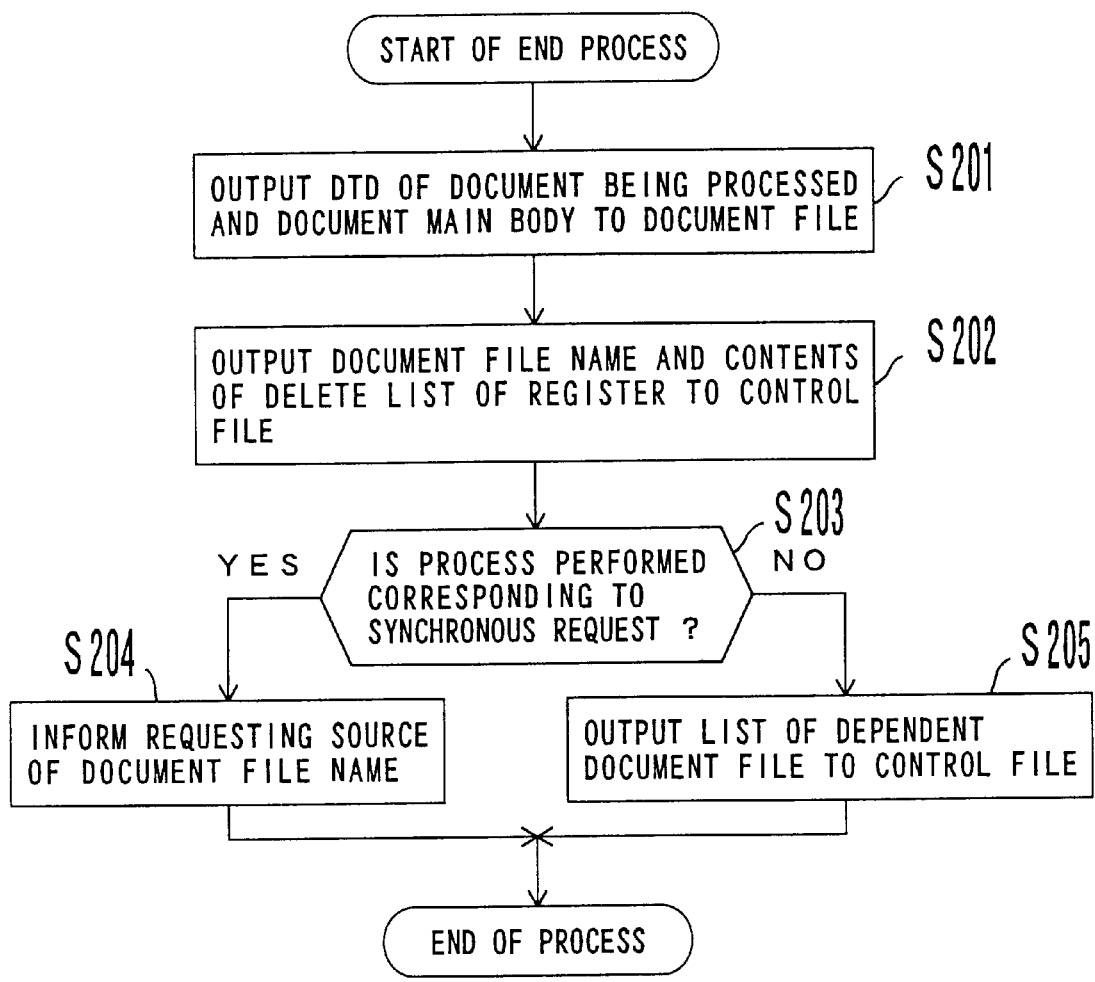
FIG. 29 is a flow chart showing an ending process.

FIG. 29 is a flowchart showing the ending process at step S106 shown in FIG. 22.

At step S201, the SGML document editing unit 10 outputs the DTD of the document being processed and the document main body to a document file.

At step S202, the SGML document editing unit 10 outputs the document file name and the contents of the delete list stored in the register to a control file At step S203, the SGML document editing unit 10 determines whether or not the synchronous process is performed. When the determined result at step S203 is Yes, the flow advances to step S204. When the determined result at step S203 is No, the flow advances to step S205.

At step S204, the SGML document editing unit 10 informs the requesting source of the document file name and completes the process.

At step S205, the SGML document editing unit 10 outputs the list of the document file with a dependent relation to the control file and then completes the process.

Next, the operation of the above-described embodiment will be described.

1) Improving the flexibility of the partial editing work with the append-/delete-reservation system According to the above-described embodiment, an append-/delete-reservation system allows a user who is editing a portion of a document to do extra editing operations as follows, which the conventional apparatus does not allow: to delete the entire portion to be edited, to append a new document element before/after the portion to be edited, and to change a tag (a generic identifier of a document element in the highest hierarchical level of the portion to be edited). Thus, the flexibility of the partial editing work is improved.

2) Enabling local parsing of the result of editing with the partial editing DTD

According to the embodiment of the present invention, the restriction against partial editing to keep the consistency of the entire document is calculated in advance and represented by a partial editing DTD corresponding to a portion to be edited. It is enough for keeping the consistency of the entire document to examine a conformance of an edited result to the partial editing DTD, namely parsing the result with the partial editing DTD. Thus, the consistency check of the edited result can be performed only by the SGML document editing unit 10 with the SGML parser 50-1, without accessing the server that manages the entire SGML document. In other words, a portion of a document can be edited independently, even in such a manner as on a personal computer in an off-line state.

3) Reducing the cost of managing the consistency of a document with the extended content model The consistency of an SGML document is the conformance of the document to its DTD. To examine whether or not an SGML document that has been partially updated conforms to the DTD (namely, to parse the SGML document), all elements of the document including elements that are not edited should be examined. In other words, each document element should be correlated with the DTD starting with the root document element; thus as well as the result of editing, the tag information (generic identifiers) of unedited parts are necessary to examine the result of the partial editing. To simply perform this operation, the document managing apparatus that stores an SGML document in units of document elements extracts tags of document elements, at least all the tags in the part of the document preceding the edited portion, from a database that stores the document. Thus, the cost to access the database that stores the document is high.

According to the present invention, a part of a document can be parsed independently with the above-described partial editing DTD so that the cost of checking the consistency of the entire document is reduced. In addition, the present invention uses an extended content model to reduce the cost of creating a partial editing DTD.

The extended content model is a variant of a content model of an element declaration in a DTD, and it represents arrangement of child document elements of its relating document element with instance identifiers of the child document elements. It reduces the cost of calculating a restriction against editing the highest hierarchical level of a document portion to be edited when a partial editing DTD is created. In other words, when an extended content model is stored, the calculation time needed to correlate document elements in the highest hierarchical level of the portion to be edited is saved by referencing the extended content model.

To store the extended content models needs some extra storage space. However, the deterioration of the storage space efficiency is not significant. When an SGML document is stored in units of document elements, link information, which links child document elements with their parent document element, is essential. Thus, the extra space needed to store an extended content model for a document element is that to store a tag sequence in a corresponding content model. Moreover, if an instance identifier in a extended content model used as the link information is used as a value of an ID attribute value, which is used for hypertextual links among document elements by an SGML appellation, the extra space used only by the present invention becomes less.

Consequently, the extended content model reduces the cost of managing the consistency of the entire document with a small overhead of storage space.

4) Storing the history information of changes to the document structure

According to the embodiment of the present invention, the history of changes of the document structure, which the conventional apparatus does not treat accurately, is stored as difference data of an extended content model and a parent element of every document element. Thus, a history of document elements that have been appended, deleted, and moved can be tracked.

5) Enabling exchanging of revision histories of a document with another SGML application According to the embodiment of the present invention, the SGML document exchanging unit outputs revision histories of a document as an SGML type document. Thus, another SGML application can use the revision histories of a document stored by the present invention.

6) Improving safety in changing the DTD

Since the DTD can be reconstructed with extended content models of all document elements in a document, even if the DTD were accidentally lost, a stored SGML document can be used by any SGML applications.

As described above, the present invention has the following effects.

1) Improvement of the efficiency of collaborative editing of a document

According to the present invention, a check-out/check-in system and an append-/delete-reservation system protect a portion of a document that a user is editing from conflicting with the other portions of the document that may be edited by other users. In addition, a partial editing DTD enables local parsing of an edited portion. A user can edit a portion of a document so far as not to violate the partial editing DTD, even delete the entire portion to be edited, append a new document element before/after the portion to be edited, or change a tag (generic identifier) of a document element in the highest hierarchical level of the portion to be edited if he/she made a reservation for those operations. Another user can also edit any other portions of the document in the same manner.

Thus, a user does not need to access a unit that manages the entire SGML document through his/her editing process, after he/she checked out the portion to be edited until he/she will check in the edited result, even in such a case that the user divides a section checked out as the entire portion to be edited into two or more sections. Moreover, when the present invention is accomplished in a distribution environment, where a server manages the entire SGML document and one or more clients perform partial editing processes, a user can perform his/her editing process in an off-line state, such as on his/her personal mobile computer. Consequently, the work efficiency of collaborative editing work can be improved.

2) Reducing the cost of creating a document with re-use of existing documents

The present invention enables a user to import a portion of another document into the document he/she is editing. Thus, a user can easily create another version of document based on an existing document by importing suitable portions of the existing document for his/her purpose, especially in such a case that an extended version of a manual needs to be created corresponding to a product with some extra options. In addition, since the present invention can supply various revisions of a document when they are required, a user can also create another version of the document based on a particular revision of an existing document, especially for such a case that an old revision of a manual needs to be revised to support customers still using a corresponding old version of a product. Moreover, since the present invention maintains the consistency between an imported document portion and its source document portion with the change mode attached to the document portions, relevant portions of different documents can be revised synchronously. Consequently, the cost of creating a document can be reduced. It should be noted that the present invention is applied for not only documents encoded in SGML, but also other types of structured electronic documents, especially documents encoded with other document descriptive languages having compatibility with SGML.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An SGML type document managing apparatus for allowing users to create, edit and use an SGML type document collaboratively, comprising:

means for automatically creating a partial editing document type definition corresponding to a partial editing request that may cause a partial structure of the document to be changed, the partial editing document type definition being formed by modifying the original document type definition of the entire document so that it represents a restriction against partial editing due to the editing state, which is determined based on the existing document structure and influence of other editing processes executing in parallel at the time when the partial editing request is issued; and means for partially editing the document on the condition that the consistency of the document can be maintained with the partial editing document type definition.

2. The SGML type document managing apparatus as set forth in claim 1, wherein the restriction due to the editing state is a possibility of which a document element can be appended before or after a portion to be edited.

3. The SGML type document managing apparatus as set forth in claim 1, wherein the restriction due to the editing state is a possibility of which a document element before or after a portion to be edited can be deleted.

4. An SGML type document managing system having a server unit and at least one client unit, the server unit including access means for accessing a database that stores an SGML type document, the client unit obtaining a portion of the SGML type document to be edited from the server unit and editing the SGML type document, wherein the client unit comprises:

means for issuing a partial editing request, which comprises a selection message to specify a portion to be edited and optionally document element reservation messages, an append-reservation message to reserve room for new document elements before or after the portion to be edited and a delete-reservation messages to declare that all the portion to be edited may be deleted;

means for obtaining data of the portion to be edited and a partial editing document type definition from the server unit corresponding to the partial editing request;

means for editing the data of the obtained document; and means for examining a conformance of an edited result to the partial editing document type definition, and the server unit comprises:

means for automatically creating a partial editing document type definition corresponding to a partial editing request from a client unit, the partial editing document type definition being formed by modifying the original document type definition of the entire document so that it represents a possibility of which a document element can be appended to or deleted from the portion to be edited depending on the document element reservation messages, the existing document structure and influence of other editing processes being executed in parallel at the time when the partial editing request is received; and means for extracting data of the portion to be edited from the database and supplying the data and the partial editing document type definition to the client unit.

5. A server unit used in an SGML type document managing system for allowing users to create, edit, and use an SGML type document collaboratively, the server unit including access means for accessing a database that stores an SGML type document, comprising:

means for creating a partial editing document type definition, which will be used in a client unit as a restriction against partial editing to keep the consistency of the entire document, corresponding to a request from a client unit, which comprises a selection message to specify a portion to be edited and optionally document element reservation messages (an append-reservation message to reserve room for new document elements before or after the portion to be edited and a delete-reservation messages to declare that all the portion to be edited may be deleted), the partial editing document type definition being formed by modifying the original document type definition of the entire document so that it represents a possibility of which a document element can be appended to or deleted from the portion to be edited depending on the document element reservation messages, the existing document structure and influence of other editing processes being executed in parallel at the time when the partial editing request is received; and means for extracting data of the portion to be edited from the database and supplying the data and the partial editing document type definition to the client unit.

6. A client unit used in an SGML type document managing system for allowing users to create, edit, and use an SGML type document collaboratively, which obtains a portion of an SGML type document to be edited from a server unit that includes access means for accessing a database that stores an SGML type document and edits the SGML type document, comprising:

means for issuing a partial editing request, which comprises a selection message to specify a portion to be edited and optionally document element reservation messages, an append-reservation message to reserve room for new document elements before or after the portion to be edited and a delete-reservation messages to declare that all the portion to be edited may be deleted;

means for obtaining data of the portion to be edited and a partial editing document type definition from the unit including the access means to the database corresponding to the partial editing request;

means for editing the data of the obtained document; and means for examining the conformance of an edited result to the partial editing document type definition.

7. An SGML type document managing apparatus for allowing users to create, edit, and use an SGML type document collaboratively, comprising:

means for storing history information of a document element being copied, moved, exchanged, appended, or deleted in an SGML format, which can indicate a change of a structure of the SGML type document; and means for outputting the stored history information in a machine-independent format.

8. The SGML type document managing apparatus as set forth in claim 7, wherein the output format uses a document type definition of an SGML type document with a history created by adding declarations of a history information portion to an original document type definition.

9. The SGML type document managing apparatus as set forth in claim 7, wherein the output history information is formed by embedding an original SGML type document in a frame of history information, and describes a revision history being listed as difference data related with corresponding document elements of the SGML type document.

10. The SGML type document managing apparatus as set forth in claim 7, wherein the output history information is formed by embedding an original SGML type document in a frame of history information, and describes a revision history as a transition of elements before and after revisions.

11. An SGML type document managing apparatus for allowing users to create, edit, and use an SGML type document collaboratively, comprising:

means for storing and managing an SGML type document as document elements with extended content models, the extended content model attached to every document element being a variant of a content model of an element declaration in a document type definition and representing arrangement of child document elements of its relating document element with instance identifiers of the child document elements;

means for automatically creating a partial editing document type definition for a document portion to be edited by using the assigned extended content model so as to independently examine whether or not the portion conforms to the document type definition; and means for allowing a document element in the highest hierarchical level of the edited portion to be deleted, the generic identifier of the document element to be changed, and a new document element to be appended before and after the document portion to be edited on the condition that the edited result does not violate the partial editing document type definition and any other portions of the document can be edited by any users.

12. The SGML type document managing apparatus as set forth in claim 11, further comprising:
   means for storing history information of a document element being copied, moved, exchanged, appended or deleted in an SGML document type; and
   means for outputting the stored history information in a machine-independent format.

13. The SGML type document managing apparatus as set forth in claim 12, further comprising:
   means for inputting and outputting an external SGML type document either with or without a history and for converting an SGML type document with extended content models into either an SGML type document without history information or an SGML type document with independent history information, and vice versa.

14. A document managing apparatus for dealing with an electronic document containing structural data, comprising:
   database means for storing document elements into which the electronic document is divided, and an entire document definition information containing information that represents an entire document structure of the electronic document;
   designating means for designating a portion of the electronic document to be edited;
   partial editing restriction information creating means for extracting a document element corresponding to the portion to be edited and the entire document definition information of the document containing the document element from said database means and for creating partial editing restriction information;
   document editing means for editing the portion designated by said designating means; and
   editing consistency examining means for determining whether or not an edited result of said editing means is consistent with the entire document corresponding to the partial editing restriction information.

15. The document managing apparatus as set forth in claim 14, further comprising:
   edited result output means for outputting the electric document to be edited corresponding to the edited result to said database means when the determined result of said editing consistency examining means is satisfied.

16. The document managing apparatus as set forth in claim 14, wherein
   said database means further stores entire document information containing a document identifier that identifies the electronic document including difference of revisions, relation information of the entire document definition information, and information that represents the relation of document elements of the electronic document, and each of the document elements is assigned instance identifiers for managing the document elements.

17. The document managing apparatus as set forth in claim 16, wherein
   each of the instance identifiers contains an element identifier that identifies a document element in a document and a document identifier of a particular version of the electronic document containing the document element.

18. The document managing apparatus as set forth in claim 14, wherein
   said database means further stores entire document information containing a document identifier that identifies the electronic document including difference of revisions, relation information of the entire document definition information, and a revision number for correlating a revised document element with a document element that has not been revised and for representing the order of revisions, and each of document elements is assigned the respective revision number.

19. The document managing apparatus as set forth in claim 18, wherein
   the entire document definition information contains information that represents the structural relation of document elements of the electronic document, each of the document elements is assigned an instance identifier for managing the document elements, and
   the document managing apparatus further comprises:
      revision history information creating means for creating revision history information corresponding to a change of the entire document definition information of each revision and appending the revision history information to the entire document definition information.

20. The document managing apparatus as set forth in claim 14, wherein
   said document editing means imports a document element from another document into the document portion to be edited when required.

21. The document managing apparatus as set forth in claim 20, wherein
   said document editing means has a share mode for causing an edited result of an imported document element of another document to be reflected to an original document element, an independent mode for causing an imported document element of another document not to be reflected to an original document element, and a link mode for prohibiting an imported document element of another document from being edited.

22. The document managing apparatus as set forth in claim 14, wherein the electronic document is based on the SGML.

23. A document managing system having a server and at least one client, the server accessing a database for storing an electronic document containing structural data, the client being connected to the server and obtaining a portion of the electronic document to be edited from the server and editing the portion, wherein
   the client comprises:
      designating means for designating the portion to be edited;
      requesting means for requesting the server for the portion to be edited designated by said designating means;
      document editing means for receiving the portion to be edited and partial editing restriction information defining a restriction thereof and for editing the portion to be edited; and
   editing consistency examining means for examining the consistency of an edited result by said document editing means corresponding to the partial editing restriction information.

24. The document managing system as set forth in claim 23, wherein the server comprises:
  database access means for receiving the portion to be edited corresponding to the request of the client and document structural data containing the portion to be edited from the database;
  partial editing restriction information creating means for creating the partial editing restriction information corresponding to the portion to be edited and the structural data of the entire document; and
  revision history information creating means for creating revision history information that represents a revision history of the document corresponding to a transition of the structure data of the entire document due to an editing operation of the client.

25. The document managing system as set forth in claim 23, wherein
  said document editing means imports a document element from another document into the document portion to be edited when required.

26. The document managing apparatus as set forth in claim 25, wherein
  said document editing means has a share mode for causing an edited result of an imported document element of another document to be reflected to an original element, an independent mode for causing an imported document element of another document not to be reflected to an original document element, and a link mode for prohibiting an imported element of another document from being edited.

27. The document managing system as set forth in claim 23, wherein
  the client performs a synchronous process with least one other client that performs an editing operation having a dependent relation with an editing operation of the client, by informing to the other client, and the server permits all clients that perform the synchronous process to check in when the consistency of the edited results of all the clients is maintained.

28. An SGML type document managing method for allowing users to create, edit, and use an SGML type document collaboratively, comprising the steps of:
  automatically creating a partial editing document type definition corresponding to a partial editing request that may cause a partial structure of the document to be changed, the partial editing document type definition being formed by modifying the original document type definition of an entire document so that it represents a restriction against partial editing due to the existing document structure and influence of other editing processes being executed in parallel at the request time; and
  partially editing the document on the condition that the consistency of the document can be maintained corresponding with the partial editing document type definition.

29. An SGML type document managing method for use in a server and at least one client, the server accessing a database that stores an SGML type document, the client obtaining a portion of the SGML type document to be edited from the server unit and editing the SGML type document, comprising the steps of:
  selecting a portion of the SGML type document to be edited;
  append-reserving or delete-reserving a document element corresponding to the portion to be edited;
  obtaining data of the portion to be edited and a partial editing document type definition from the server corresponding to the selecting, the append-reserving, or the delete-reserving, corresponding to the portion to be edited;
  editing the data of the obtained document; and
  examining a consistency of an edited result corresponding to the partial editing document type definition;
  analyzing a possibility of which a document element can be appended to or deleted from a portion to be edited depending on an entire document type definition corresponding to a request of the selecting, the append-reserving, or the delete-reserving, corresponding to the portion to be edited, the request being received from the client and for creating a partial editing document definition in which the consistency of the entire document is maintained for a partial editing operation including an append operation or a delete operation of a document element corresponding to the request; and
  extracting data of the portion to be edited from the database and supplying the data and the partial editing document type definition to the client unit.

30. An SGML type document managing method for use in a server for accessing a database that stores an SGML type document, comprising the steps of:
  creating a partial editing document type definition, which will be used in a client as a restriction against partial editing to keep the consistency of the entire document, corresponding to a request from a client, which comprises a selection message to specify a portion to be edited and optionally document element reservation messages (an append-reservation message to reserve room for new document elements before or after the portion to be edited and a delete-reservation messages to declare that all the portion to be edited may be deleted), the partial editing document type definition being formed by modifying the original document type definition of the entire document so that it represents a possibility of which a document element can be appended to or deleted from the portion to be edited depending on the document element reservation messages, the existing document structure and influence of other editing processes being executed in parallel at the time when the partial editing request is received; and
  extracting data of the portion to be edited from the database and supplying the data and the partial editing document type definition to the client.

31. An SGML type document managing method for use in a client unit for obtaining a portion of an SGML type document to be edited from a server unit that accesses a database that stores an SGML type document, and for editing the SGML type document, comprising the steps of:
  issuing a partial editing request, which comprises a selection message to specify a portion to be edited and optionally document element reservation messages, an append-reservation message to reserve room for new document elements before or after the portion to be edited and a delete-reservation messages to declare that all the portion to be edited may be deleted;
  obtaining data of the portion to be edited and a partial editing document type definition from the server unit corresponding to the partial editing request;
  editing the data of the obtained document; and
  examining the conformance of an edited result corresponding to the partial editing document type definition.

32. An SGML type document managing method of allowing users to create, edit, and use an SGML type document collaboratively, comprising the steps of:

storing a history information of a document element being copied, moved, exchanged, appended, or deleted in an SGML form, which can indicate a change of a structure of the SGML type document; and outputting the stored history information in a machine independent format.

33. An SGML type document managing method of allowing users to create, edit, and use an SGML type document collaboratively, comprising the steps of:

storing and managing an SGML type document as document elements with extended content models, the extended content model attached to every document element being a variant of a content model of a element declaration in a document type definition and representing arrangement of child document elements of its relating document element with instance identifiers of the child document elements;

automatically creating a partial editing document type definition for a document portion to be edited by using the assigned extended content model so as to independently examine whether or not the portion conforms to the document type definition; and allowing a document element in the highest hierarchical level of the edited portion to be deleted, the generic identifier of the document element to be changed, and a new document element to be appended before and after the document portion to be edited on the condition that the edited result does not violate the partial editing document type definition and any other portions of the document can be edited by any users.

34. A computer-readable storage medium used to direct a computer for allowing users to create, edit, and use an SGML type document collaboratively, to perform the functions of:

automatically creating a partial editing document type definition corresponding to a partial editing request that may cause a partial structure of the document to be changed, the partial editing document type definition being formed by modifying the original document type definition of an entire document so that it represents a restriction against partial editing due to an editing state; and partially editing the document on the condition that the consistency of the document can be maintained with the partial editing document type definition.

35. A computer-readable storage medium used to direct a computer system having a server and at least one client, the server accessing a database that stores an SGML type document, the client obtaining a portion of the SGML type document to be edited from the server unit and editing the SGML type document, to perform the functions of:

selecting a portion of the SGML type document to be edited;

append-reserving or delete-reserving a document element corresponding to the portion to be edited;

obtaining data of the portion to be edited and a partial editing document type definition from the server corresponding to the selecting, the append-reserving, or the delete-reserving, corresponding to the portion to be edited;

editing the data of the obtained document; and examining a consistency of an edited result corresponding to the partial editing document type definition;

analyzing a possibility of which a document element can be appended to or deleted from a portion to be edited depending on an entire document type definition corresponding to a request of the selecting, the append-reserving, or the delete-reserving, corresponding to the portion to be edited, the request being received from the client and for creating a partial editing document definition in which the consistency of the entire document is maintained for a partial editing operation including an append operation or a delete operation of a document element corresponding to the request; and extracting data of the portion to be edited from the database and supplying the data and the partial editing document type definition to the client unit.

36. A computer-readable storage medium used to direct a computer used as a server allowing users to create, edit, and use an SGML type document collaboratively, for accessing a database that stores an SGML type document, to perform the functions of:

creating a partial editing document type definition, which will be used in a client unit as a restriction against partial editing to keep the consistency of the entire document, corresponding to a request from a client unit, which comprises a selection message to specify a portion to be edited and optionally document element reservation messages (an append-reservation message to reserve room for new document elements before or after the portion to be edited and a delete-reservation message to declare that all the portion to be edited may be deleted), the partial editing document type definition being formed by modifying the original document type definition of the entire document so that it represents a possibility of which a document element can be appended to or deleted from the portion to be edited depending on the document element reservation messages, the existing document structure and influence of other editing processes being executed in parallel at the time when the partial editing request is received; and extracting data of the portion to be edited from the database and supplying the data and the partial editing document type definition to the client unit.

37. A computer-readable storage medium used to direct a computer used as a client obtaining a portion of an SGML type document to be edited from a unit that accesses a database that stores an SGML type document and for editing the SGML type document, to perform the functions of:

issuing a partial editing request, which comprises a selection message to specify a portion to be edited and optionally document element reservation messages, an append-reservation message to reserve room for new document elements before or after the portion to be edited and a delete-reservation message to declare that all the portion to be edited may be deleted;

obtaining data of the portion to be edited and a partial editing document type definition from the server unit corresponding to the partial editing request;

editing the data of the obtained document; and examining the conformance of an edited result to the partial editing document type definition.

38. A computer-readable storage medium used to direct a computer for allowing users to create, edit, and use an SGML type document collaboratively, to perform the functions of:

storing a history information of a document element being copied, moved, exchanged, appended, or deleted in an SGML form, which can indicate a change of a structure of the SGML type document; and outputting the stored history information in a machine independent format.

39. A computer-readable storage medium used to direct a computer for allowing users to create, edit, and use an SGML type document collaboratively, to perform the functions of:

storing and managing an SGML type document as document elements with extended content models, the extended content model attached to every document element being a variant of a content model of a element declaration in a document type definition and representing arrangement of child document elements of its relating document element with instance identifiers of the child document elements;

automatically creating a partial editing document type definition for a document portion to be edited by using the assigned extended content model so as to independently examine whether or not the portion conforms to the document type definition; and allowing a document element in the highest hierarchical level of the edited portion to be deleted, the generic identifier of the document element to be changed, and a new document element to be appended before and after the document portion to be edited in the condition that the edited result does not violate the partial editing document type definition and any other portions of the document can be edited by any users.

40. A computer-readable storage medium used to direct a computer to perform the functions of:

storing document elements into which the electronic document is divided, and an entire document definition information, the entire document definition information containing information that represents an entire document structure of the electronic document;

designating a portion of the electronic document to be edited;

extracting a document element corresponding to the portion to be edited and the document definition information of the document containing the document element and for creating partial editing restriction information;

editing the portion designated by the designating means; and determining whether or not an edited result of the editing means is consistent with the entire document by using the partial editing restriction information.

* * * * *